(12) United States Patent
Trevarthen

(10) Patent No.: US 10,077,756 B2
(45) Date of Patent: Sep. 18, 2018

(54) HYDROKINETIC SYSTEM

(71) Applicant: Pliosaur Energy Ltd., Portishead, Somerset (GB)

(72) Inventor: Jeremy Trevarthen, Somerset (GB)

(73) Assignee: Pliosaur Energy Ltd. (GB)

( * ) Notice: Subject to any disclaimer, the term of this patent is extended or adjusted under 35 U.S.C. 154(b) by 0 days.

(21) Appl. No.: 15/109,270

(22) PCT Filed: Dec. 19, 2014

(86) PCT No.: PCT/GB2014/053807
§ 371 (c)(1),
(2) Date: Jun. 30, 2016

(87) PCT Pub. No.: WO2015/101781
PCT Pub. Date: Jul. 9, 2015

(65) Prior Publication Data
US 2016/0327014 A1    Nov. 10, 2016

(30) Foreign Application Priority Data

Jan. 2, 2014 (GB) .................................. 1400026.9

(51) Int. Cl.
*F03B 13/10* (2006.01)
*F03B 15/00* (2006.01)
(Continued)

(52) U.S. Cl.
CPC .............. *F03B 13/22* (2013.01); *F03B 13/10* (2013.01); *F03B 13/264* (2013.01);
(Continued)

(58) Field of Classification Search
CPC ........ F03B 13/10; F03B 13/22; F03B 13/264; F05B 2240/12; F05B 2240/917;
(Continued)

(56) References Cited

U.S. PATENT DOCUMENTS 4,335,576 A * 6/1982 Hopfe .................... B01D 61/10
        159/DIG. 27
4,352,990 A * 10/1982 Aucoin, Jr. ........... F03B 17/064
        290/54

(Continued)

FOREIGN PATENT DOCUMENTS

KR      200445087 Y1    6/2009
WO      2006026838 A2   3/2006

OTHER PUBLICATIONS

Lux, Ralph; International Search Report and Written Opinion of the International Searching Authority; International Application No. PCT/GB2014/053807; dated May 6, 2015; European Patent Office; Rijswijk, Netherlands.

*Primary Examiner* — Tulsidas C Patel
*Assistant Examiner* — S. Mikailoff
(74) *Attorney, Agent, or Firm* — Stevens & Showalter, LLP

(57) ABSTRACT

A hydrokinetic system for generating electricity from hydropower, the system comprising a floatable or floating structure for mooring, the structure comprising: a generally horizontal rotor (12); a deflector (13, 15) for deflecting impinging water to an undershoot flow-path and to an overtopping flow-path to rotate the rotor; and a generator for generating electricity from rotation of the rotor. Networking of the system is also described, as is an anchor for mooring and a method of mooring.

15 Claims, 19 Drawing Sheets

(51) Int. Cl.
  *F03B 13/22* (2006.01)
  *F03B 13/26* (2006.01)
  *H02K 7/18* (2006.01)

(52) U.S. Cl.
  CPC ........ *H02K 7/1823* (2013.01); *F05B 2240/12* (2013.01); *F05B 2240/917* (2013.01); *F05B 2240/97* (2013.01); *Y02E 10/28* (2013.01); *Y02E 10/38* (2013.01)

(58) Field of Classification Search
  CPC ... F05B 2240/97; H02K 7/1823; Y02E 10/28; Y02E 10/38
  See application file for complete search history.

(56) References Cited

U.S. PATENT DOCUMENTS

| | | | |
|---|---|---|---|
| 4,764,683 A | 8/1988 | Coombes | |
| 4,850,190 A * | 7/1989 | Pitts | F03B 13/10 290/53 |
| 6,100,600 A * | 8/2000 | Pflanz | B01D 61/10 290/4 R |
| 8,564,152 B1 * | 10/2013 | Costas | F03B 13/22 290/42 |
| 9,512,816 B2 * | 12/2016 | Ferguson | F03B 7/003 |
| 2007/0020097 A1 | 1/2007 | Ursua | |
| 2007/0108768 A1 * | 5/2007 | Dempster | F03B 17/063 290/42 |
| 2010/0237625 A1 * | 9/2010 | Dempster | F03B 7/00 290/54 |
| 2013/0043682 A1 * | 2/2013 | Rhinefrank | F03B 13/20 290/53 |
| 2013/0069372 A1 * | 3/2013 | Ferguson | F03B 7/003 290/54 |
| 2013/0088013 A1 * | 4/2013 | Yan | F03B 17/063 290/54 |
| 2013/0115045 A1 | 5/2013 | Korac | |

* cited by examiner

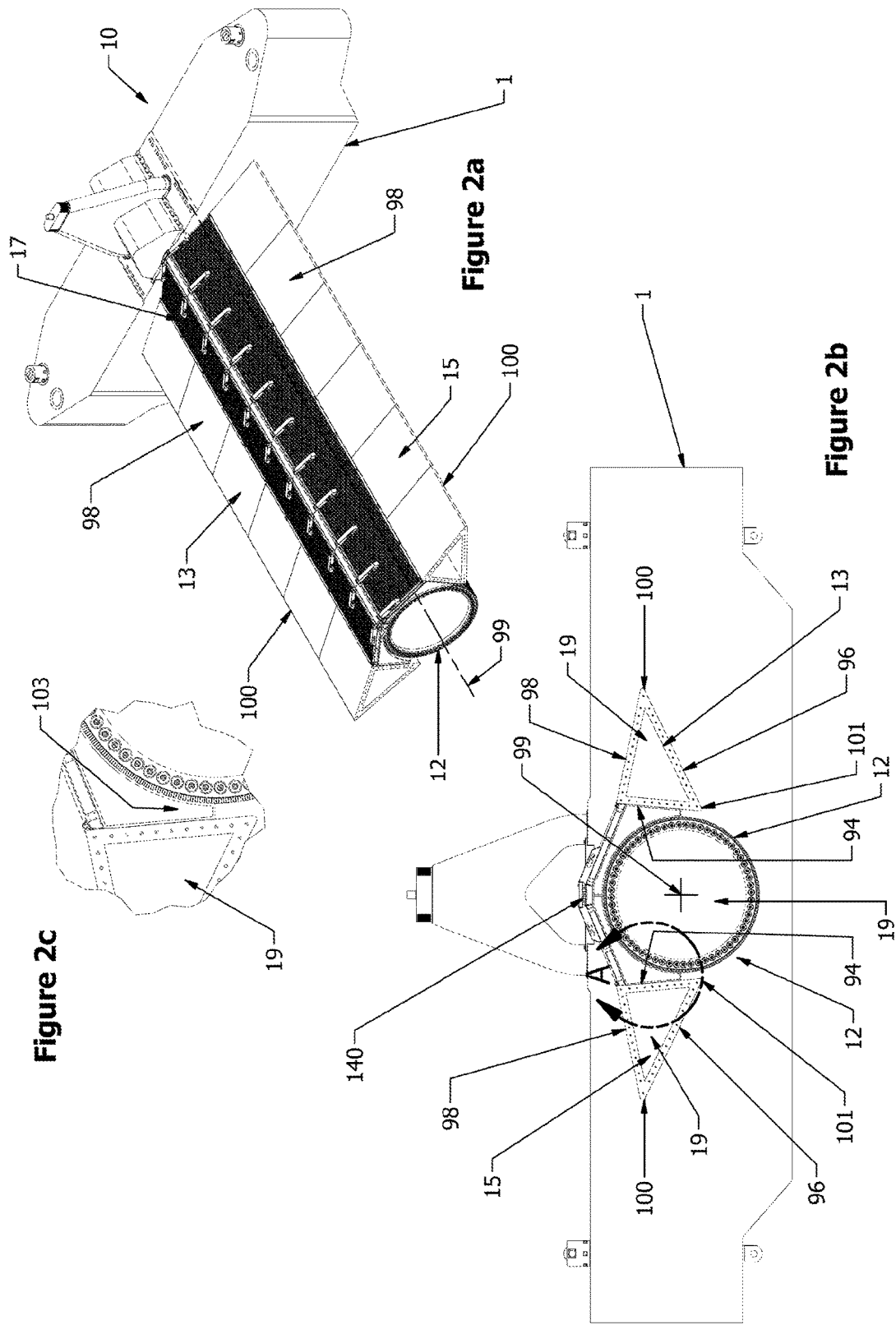

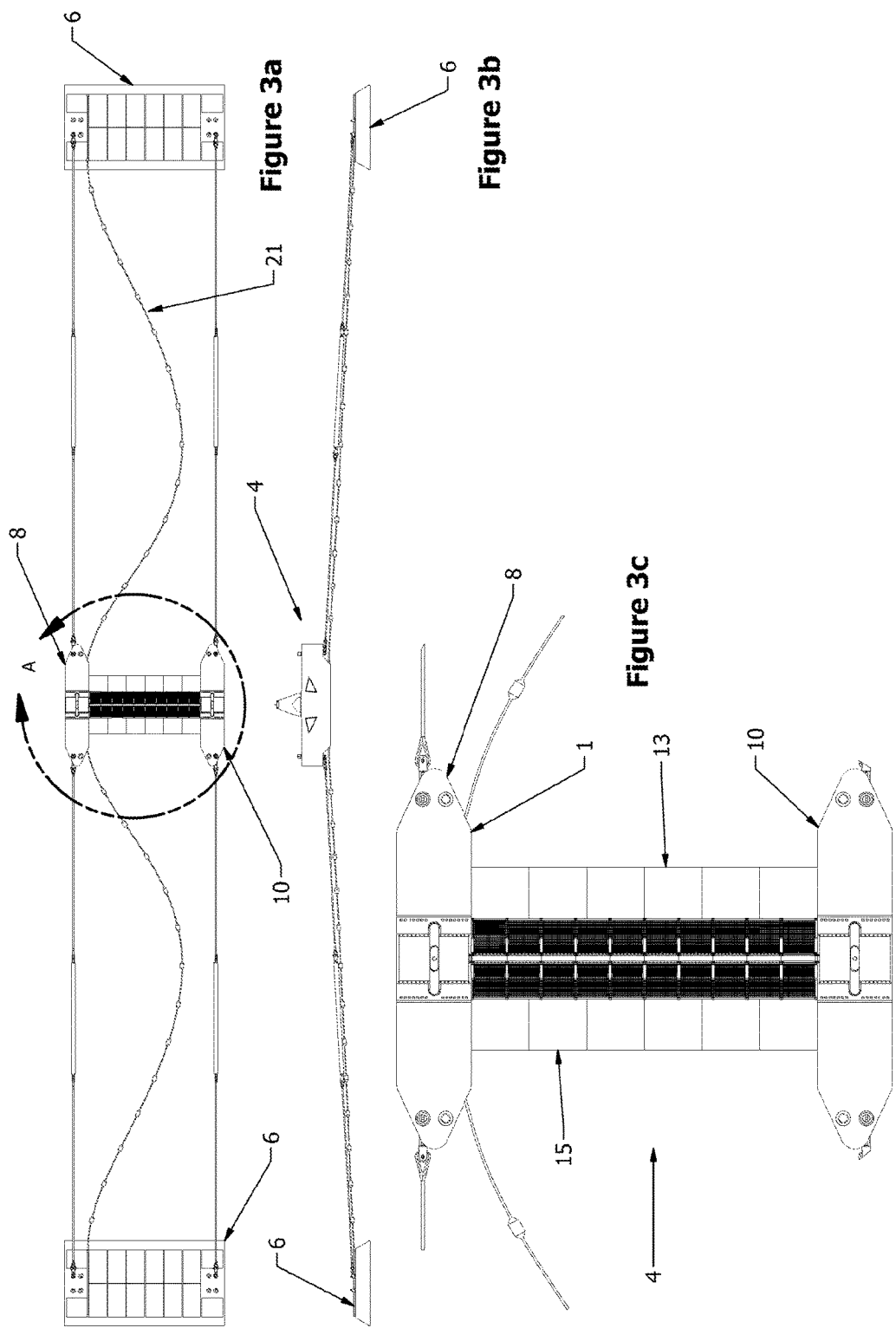

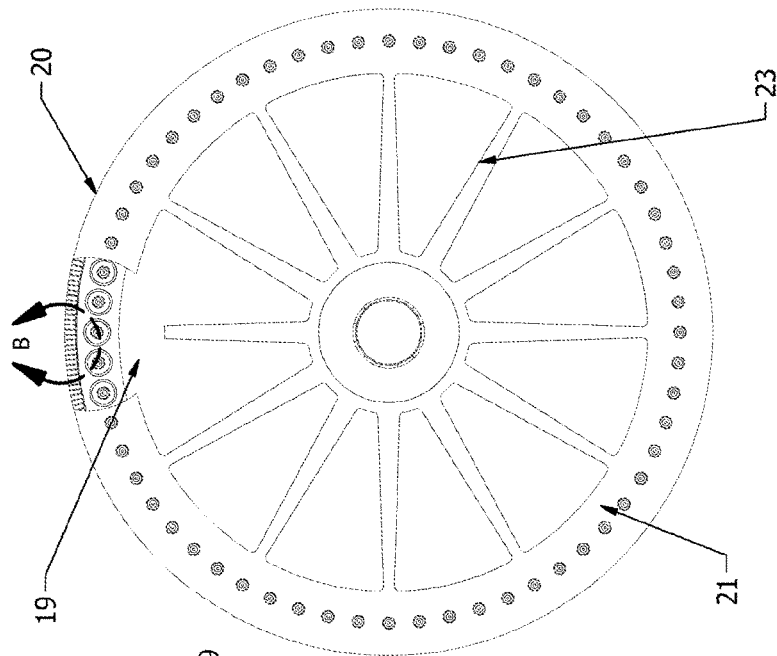
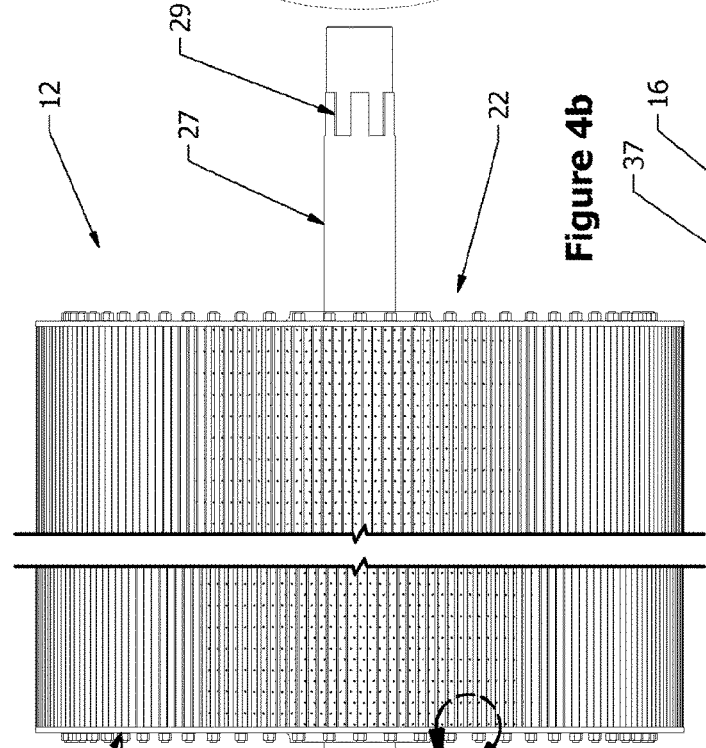
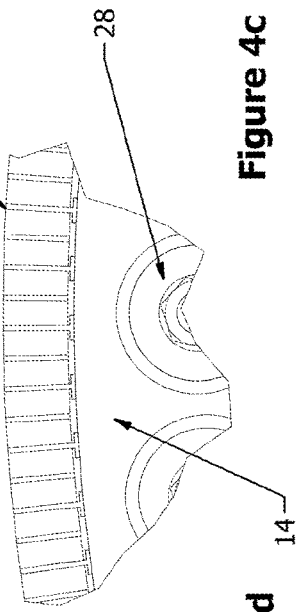
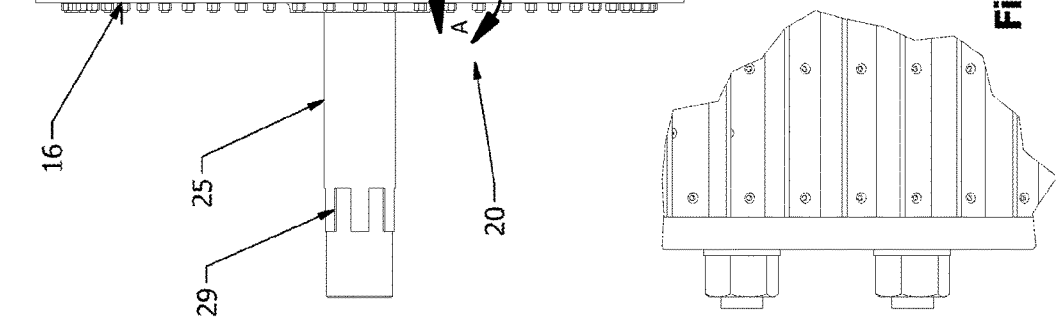
Figure 4a
Figure 4b
Figure 4c
Figure 4d

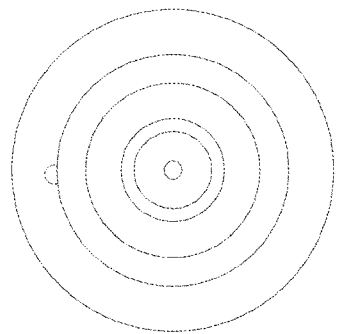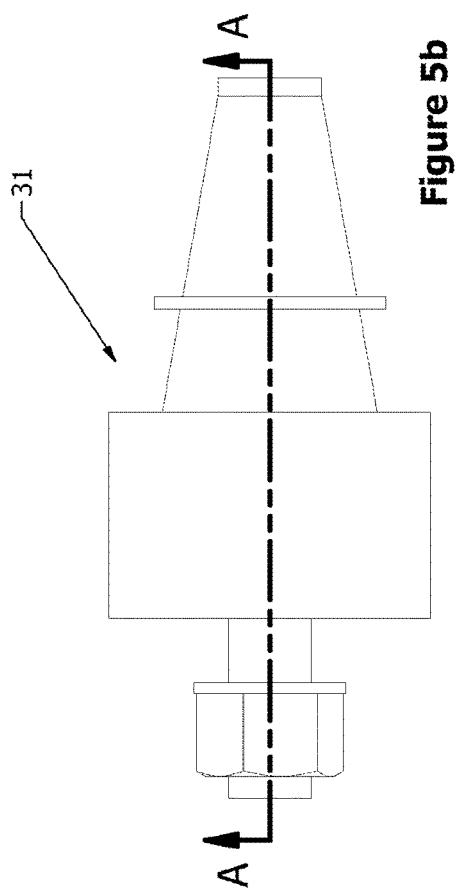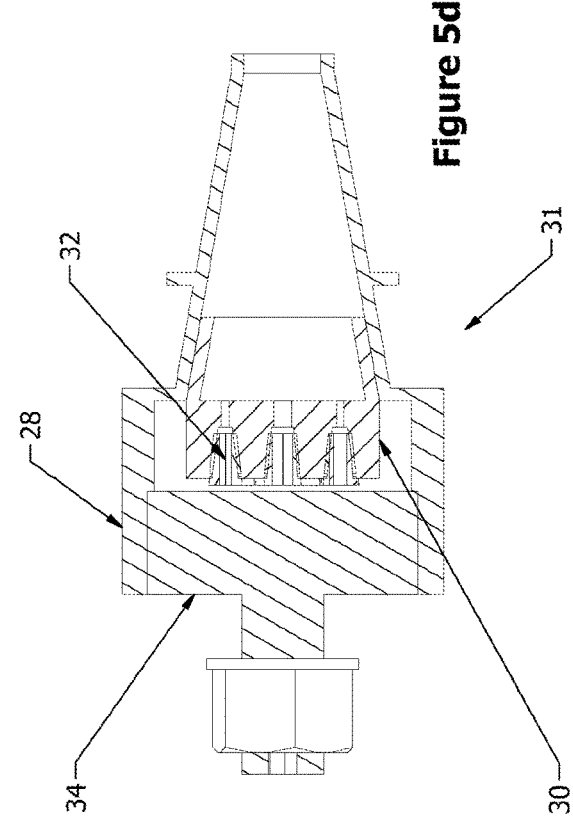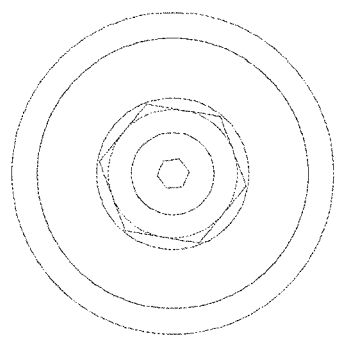

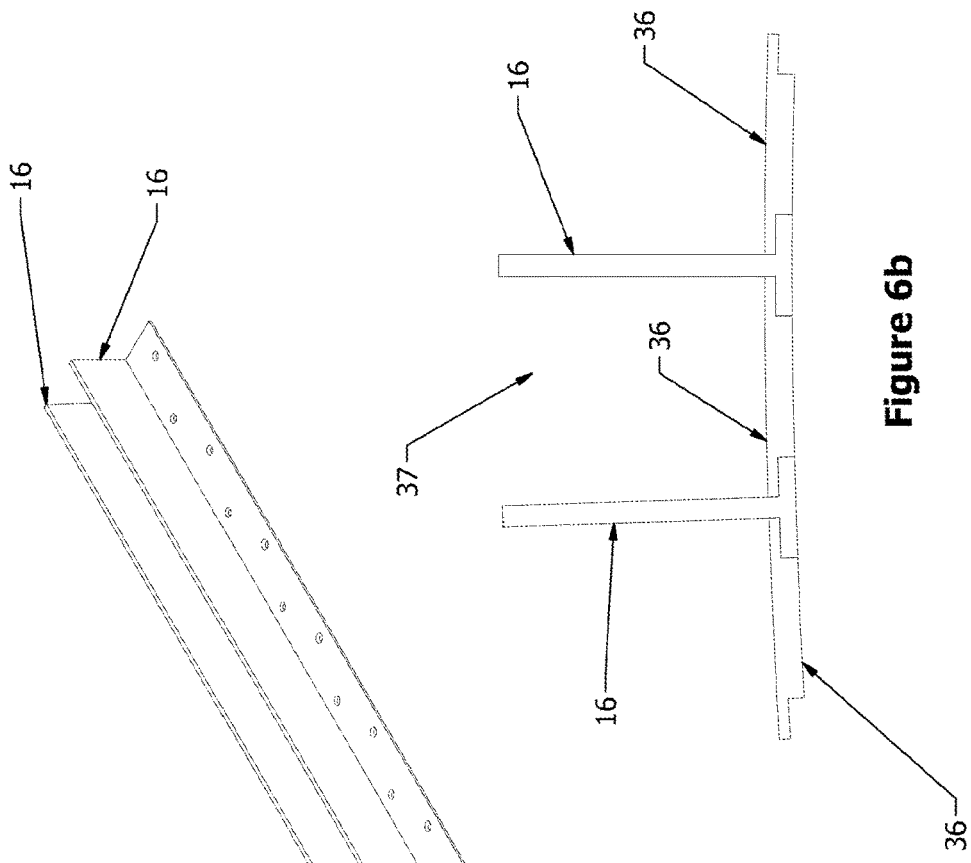
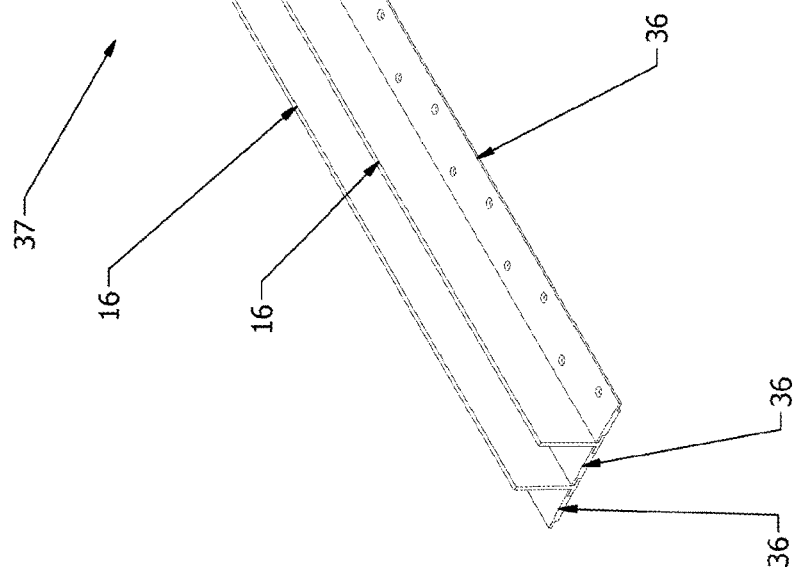

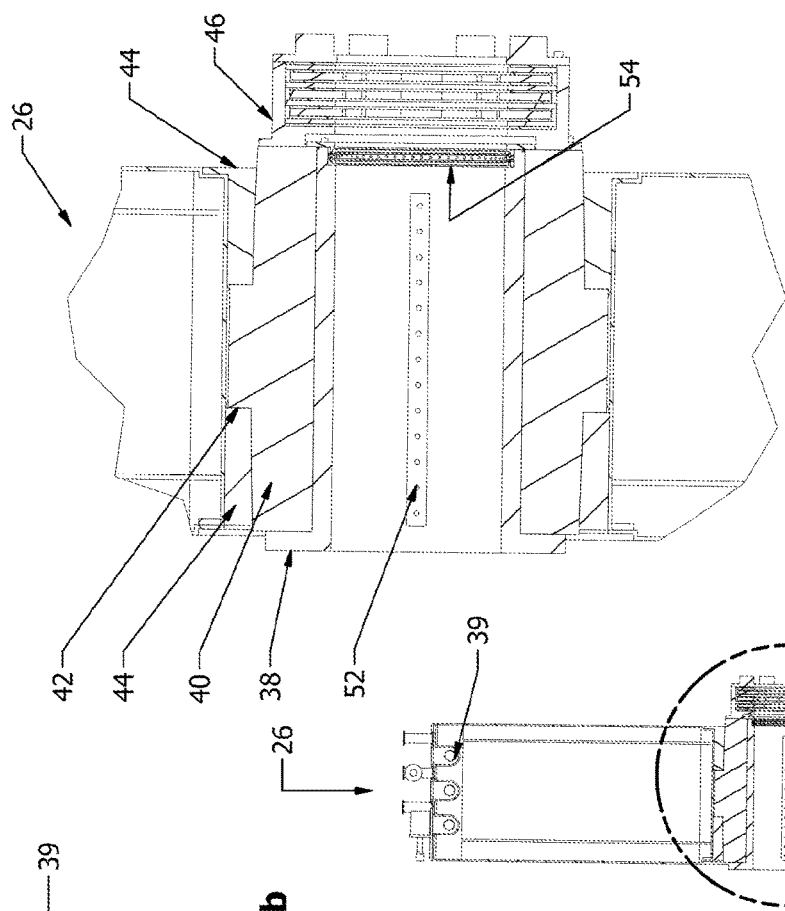
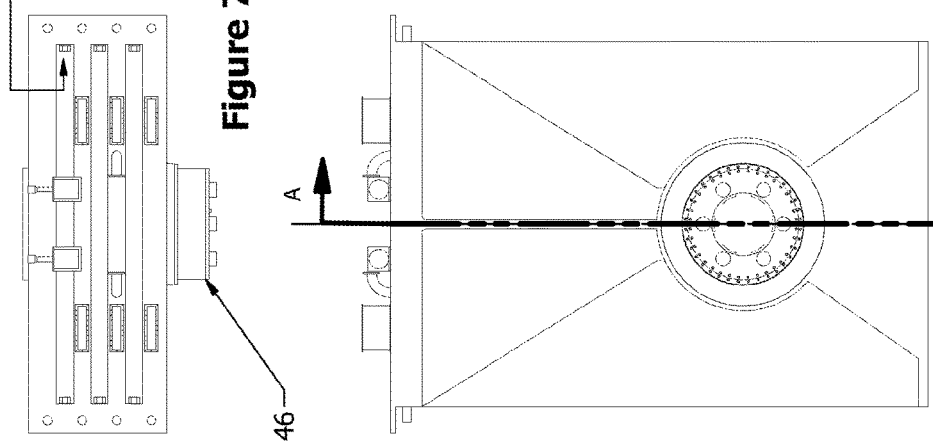
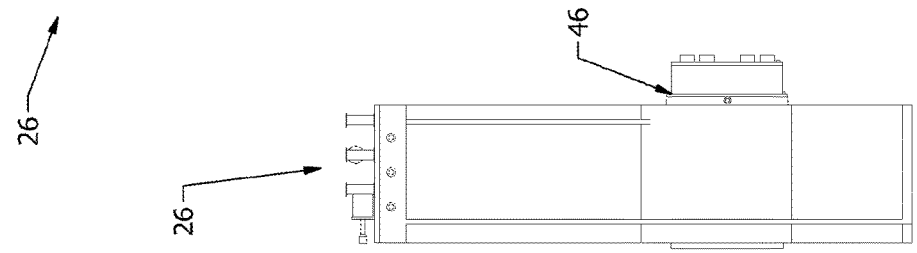
Figure 7e
Figure 7d
Figure 7b
Figure 7c
Figure 7a

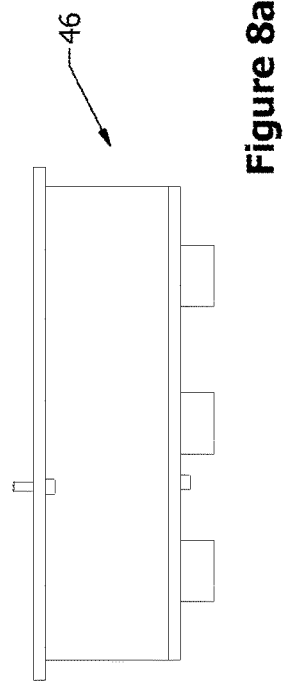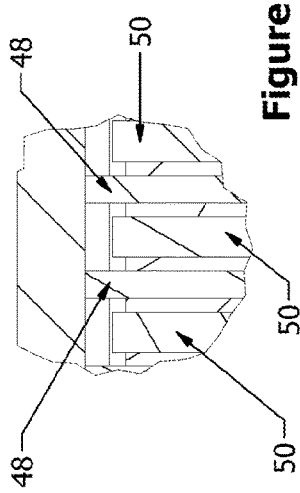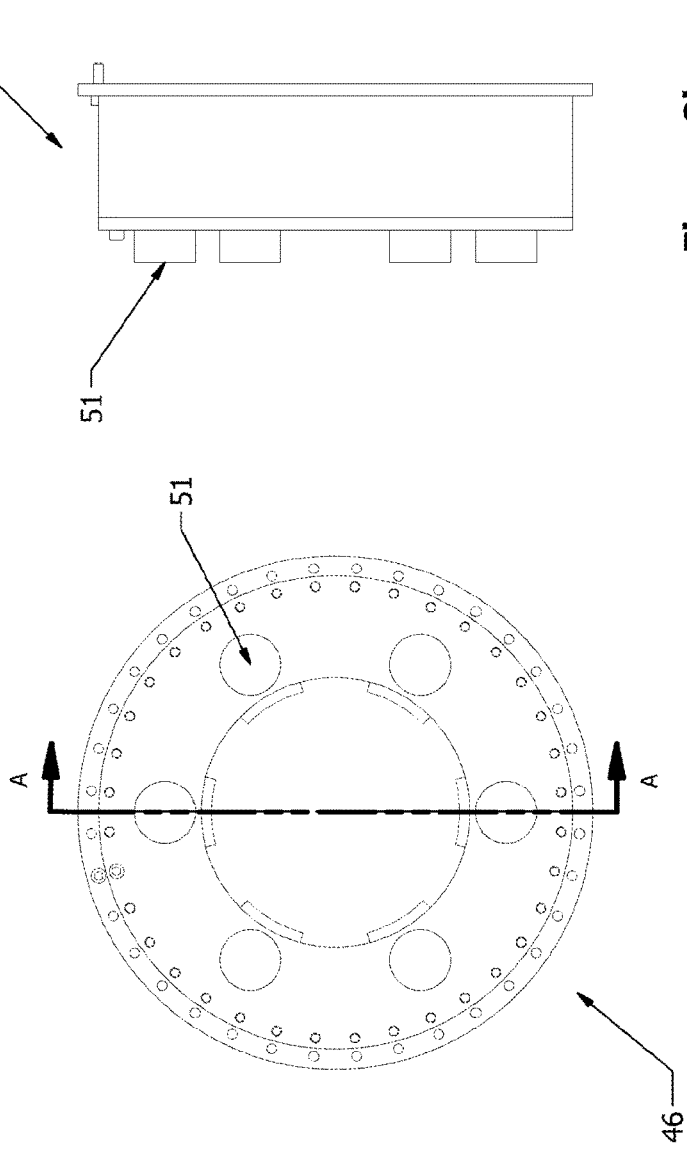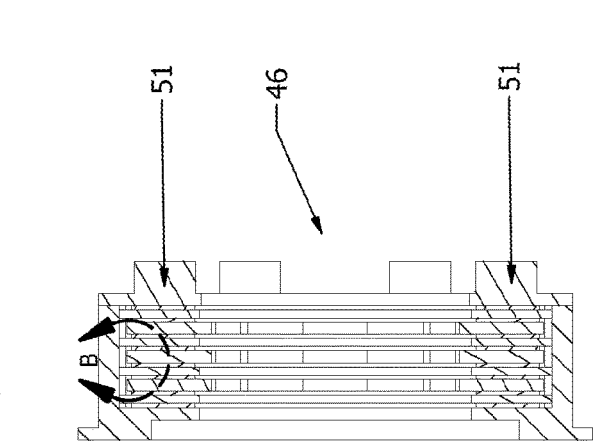

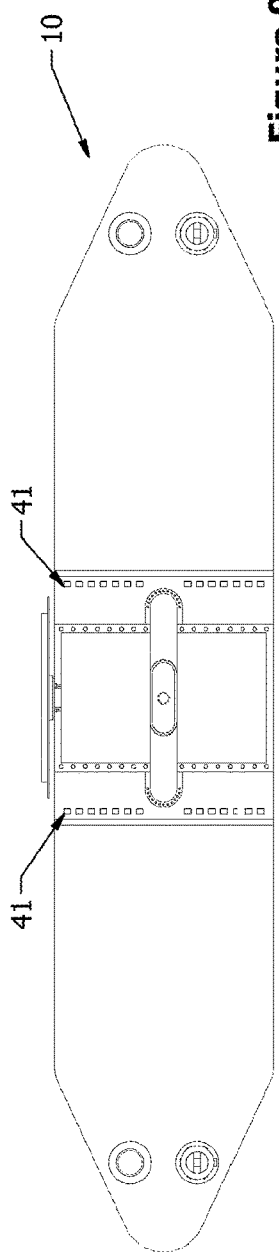
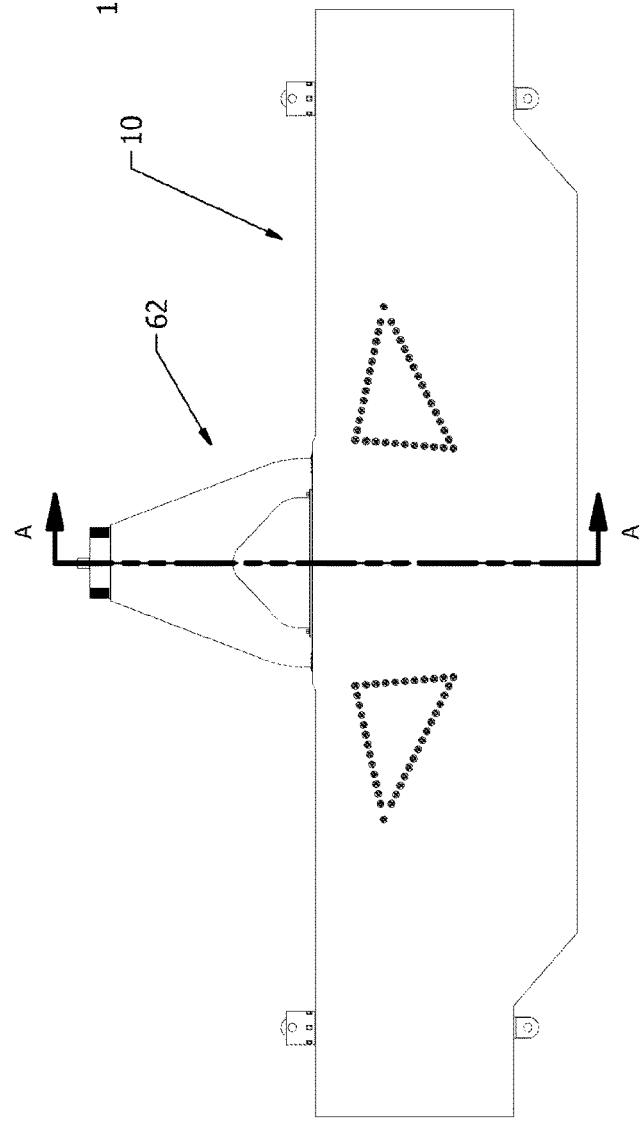
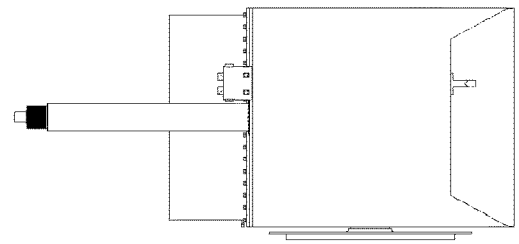

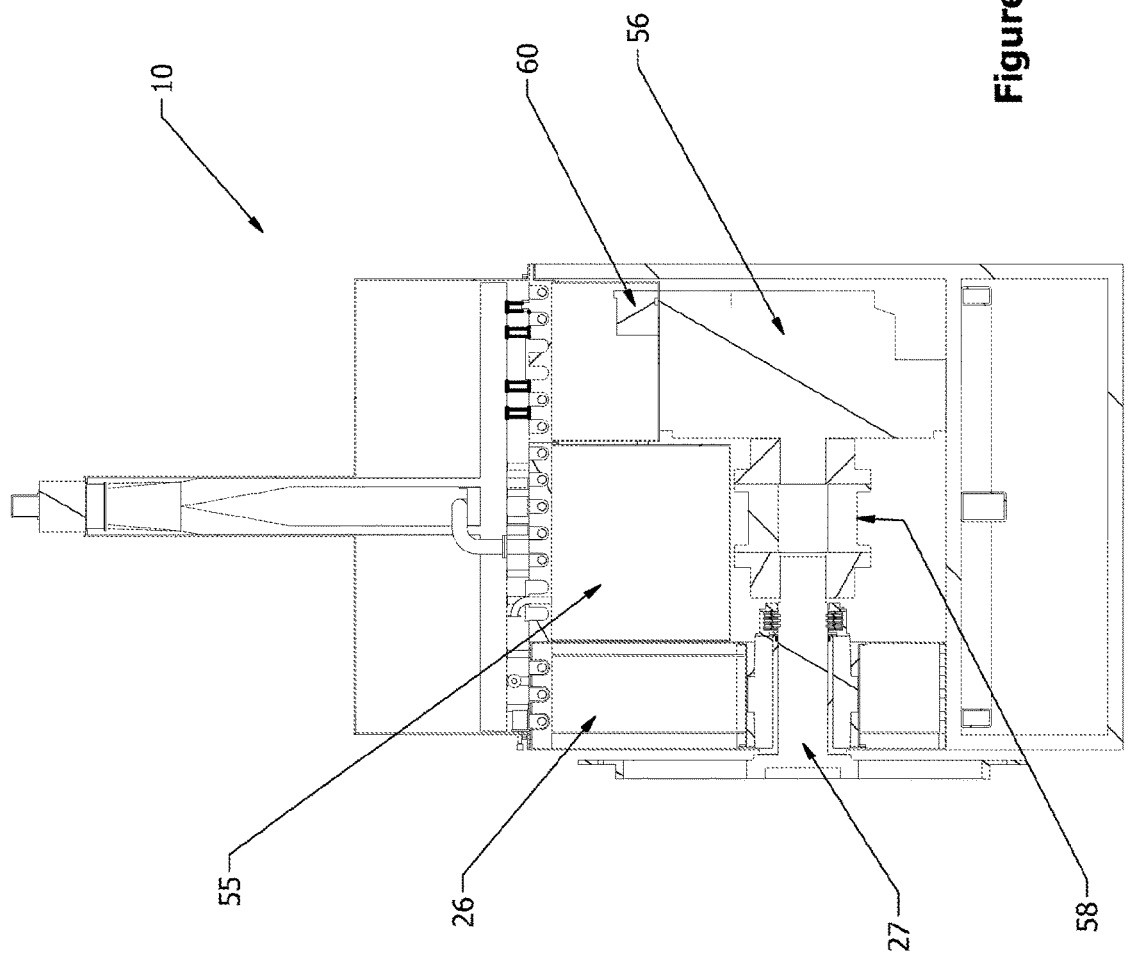

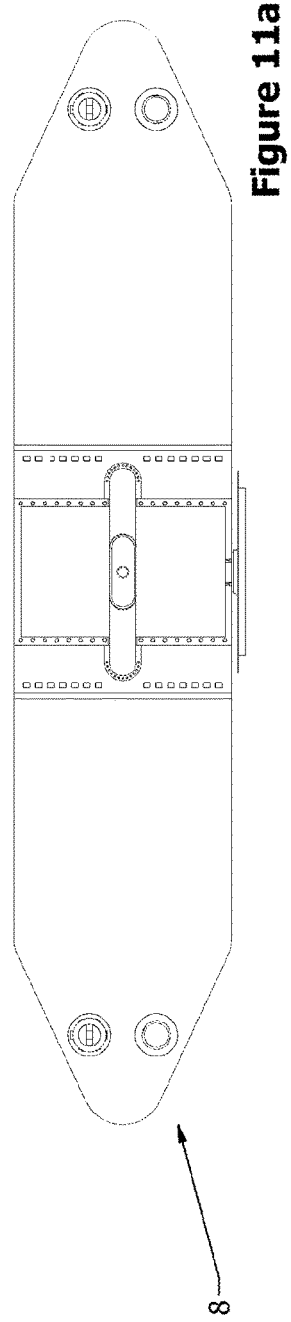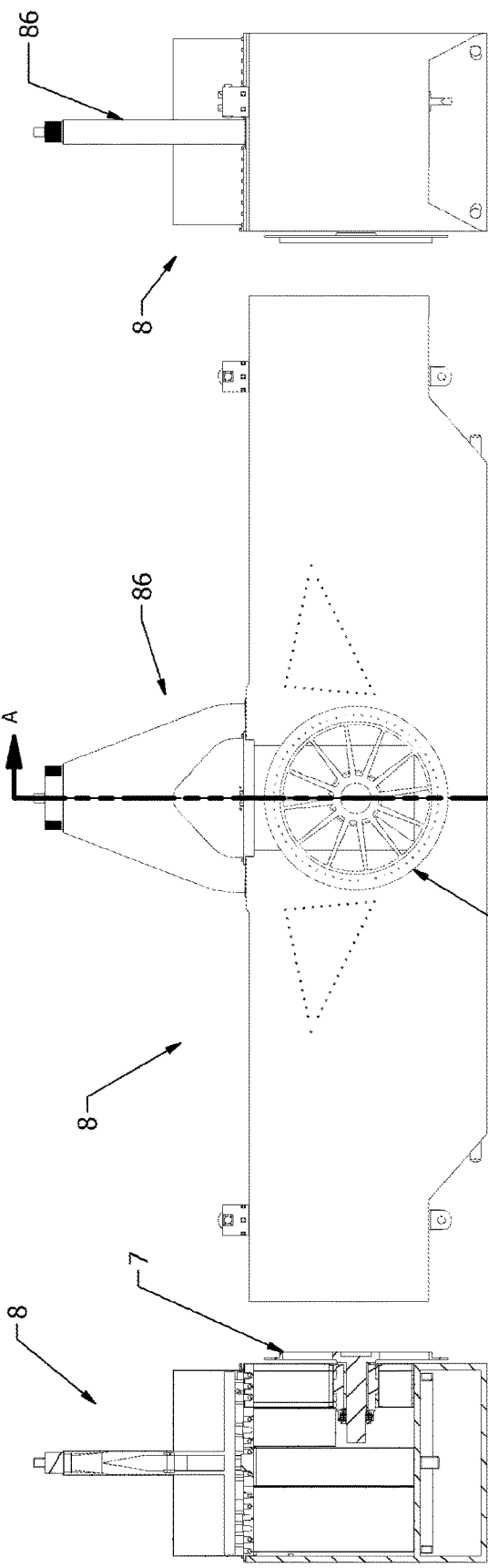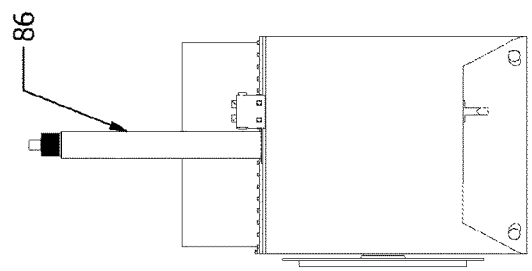

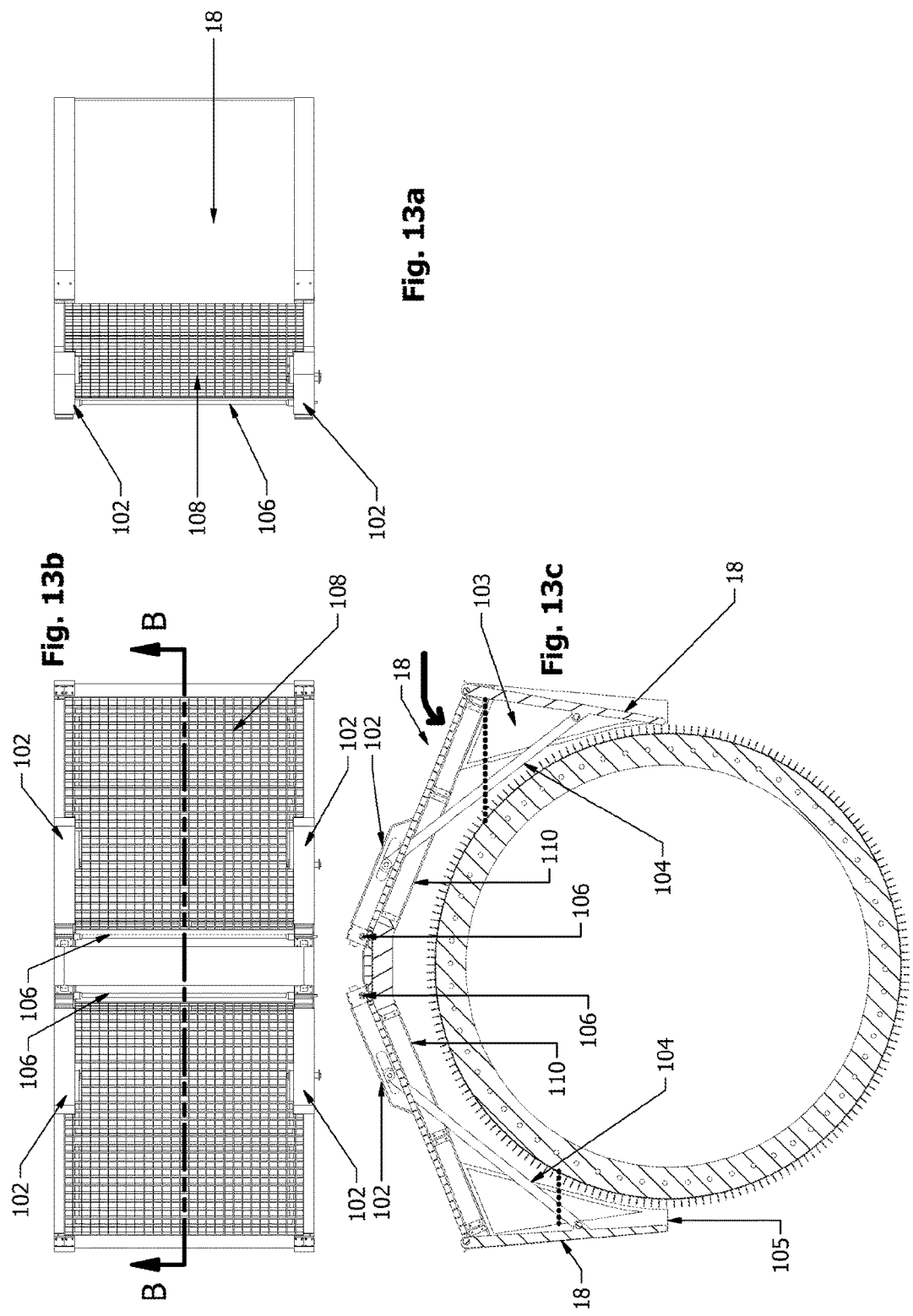

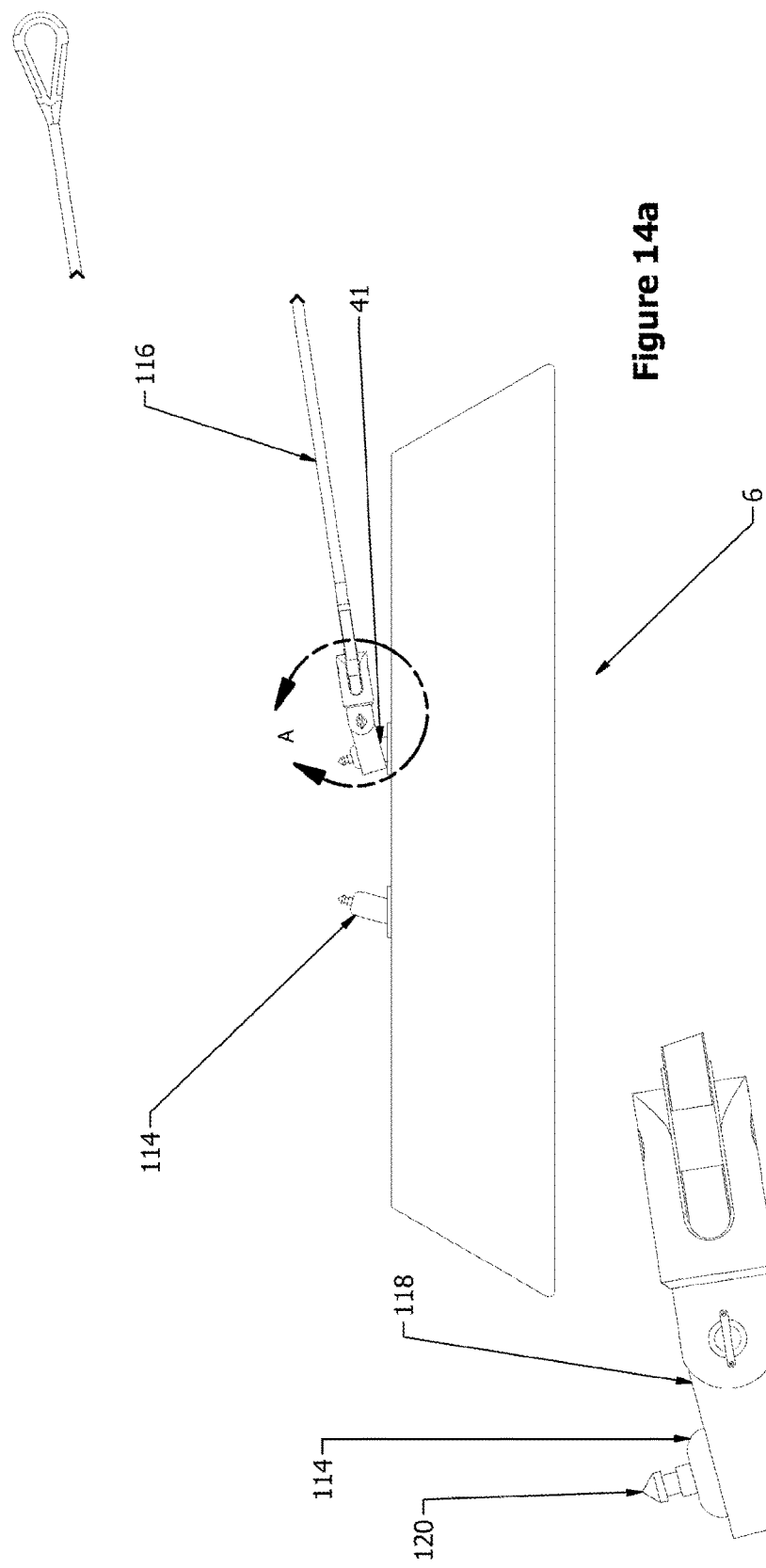

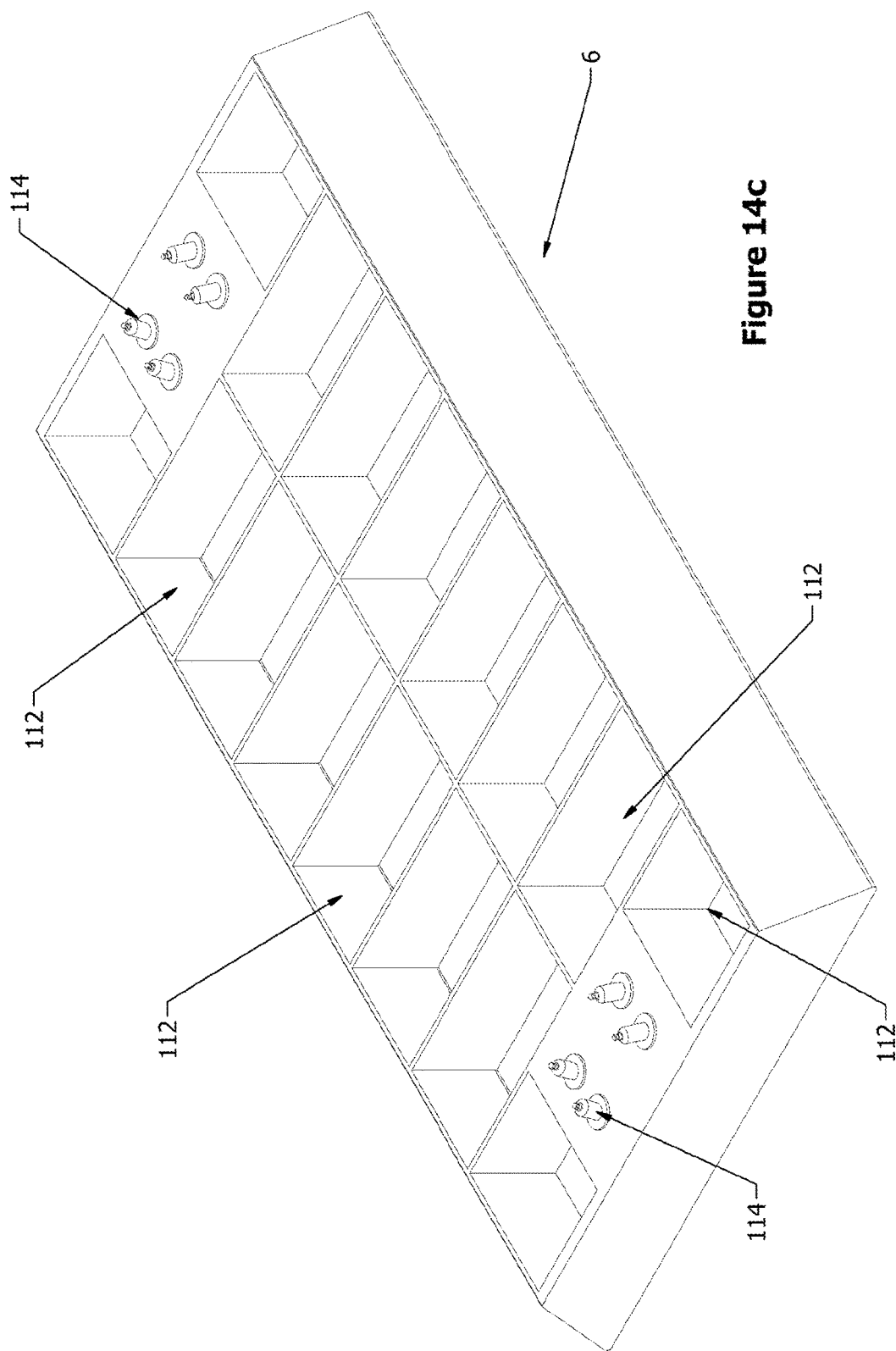

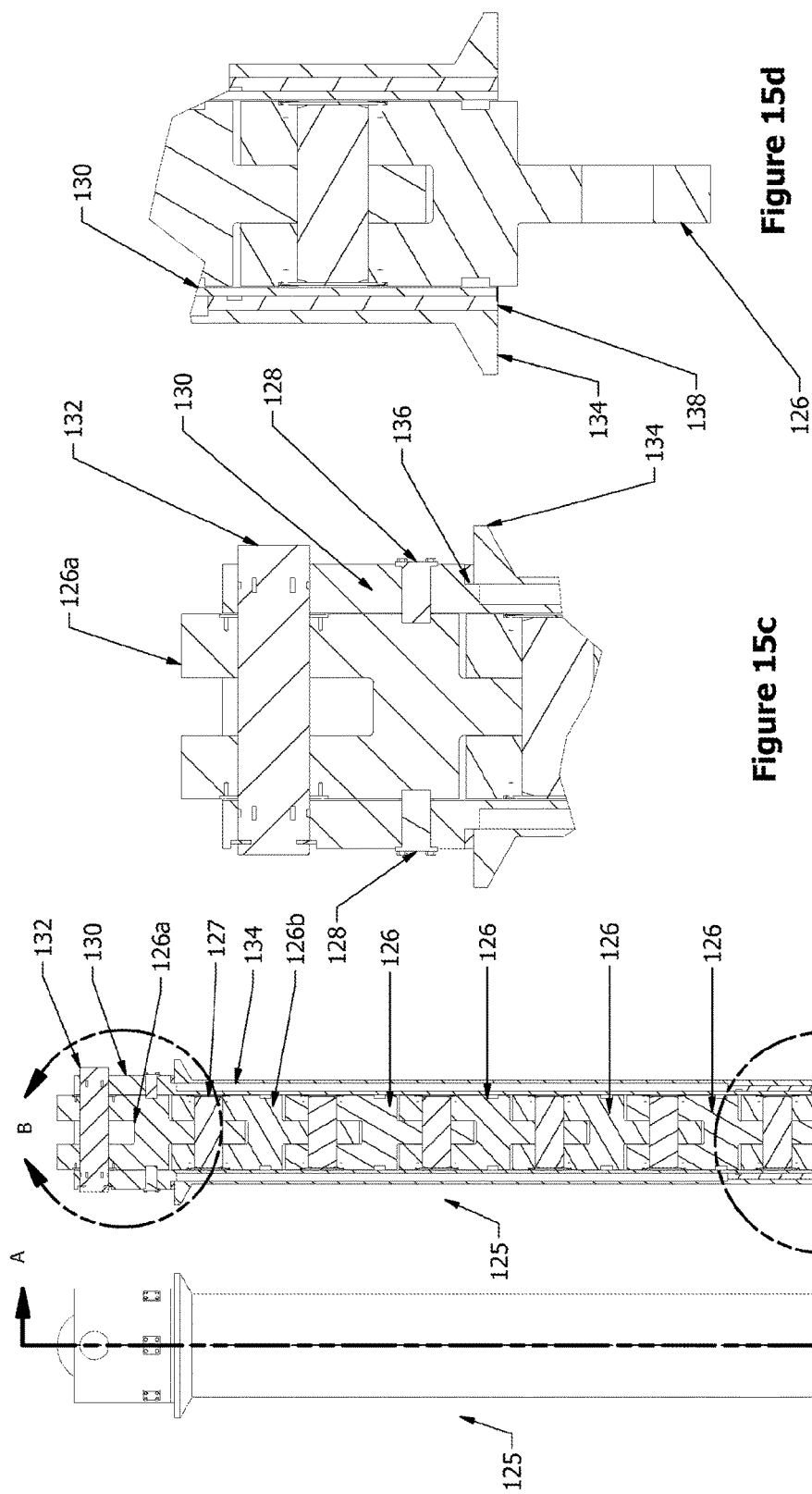

HYDROKINETIC SYSTEM

FIELD OF THE INVENTION

This invention relates to the generation of electricity from hydro-power. In particular, though not exclusively, this invention relates to hydrokinetic systems for generating electricity from river, oceanic and tidal currents, as well as wave energy, to an anchor, and to a method of mooring.

BACKGROUND TO THE INVENTION

Renewable energy sources are essentially inexhaustible, unlike fossil fuels that are finite. It is also widely held that the greenhouse gases released when fossil fuels are burned are contributing towards changes in our climate and rises in global temperatures therefore; by increasing the amount of renewable energy produced we are not only acting sustainably but also helping to protect the environment.

Hydro power is a commercial technology that already accounts for a significant proportion of the world's existing renewable output with most of this output produced by large scale hydro projects using turbines to exploit the potential energy of the fluid trapped behind a dam. The problem with this type of development is the ever increasing constraints placed upon land use, environmental concerns and the high capital costs.

Hydrokinetic energy is a largely under exploited yet significant global marketing opportunity for any new technology that can reliably deliver competitively priced electricity for the consumer. Recent historical precedents also indicate that any new technology must also satisfy the growing expectations of environmental interests, vested lobby groups and the local population before it has a realistic probability of being sanctioned by the local authorities as well as meeting environmental standards as set out in various EU directives and domestic legislation. This business sector is attracting a growing level of interest from companies globally, but no front runner has been identified and all of the existing systems have some form of commercial or design limitation.

Technological development of hydrokinetic devices can be traced back to the Roman Architect Vitruvius who deployed an undershot waterwheel. The Romans also constructed an impressive flour mill at Barbegal that deployed 16 overshot water wheels. Evidence also exists that suggests the Romans were the first to deploy a floating undershot waterwheel used to drive a flour mill on the Tiber River.

Most of the waterwheels no longer operate commercially, due to their low power output, but re-evaluation of this technology is of interest to many in the renewable energy sector who are attempting to merge new and old technologies. An example of this is the Darrieus, Savonius, Barrel and Flipwing rotors marketed by 'Hydro volt' in the USA.

There also exist commercial examples of axial flow turbines, vertical axis turbines and hybrid technologies, such as Archimedes screw type rotors. Prior art wheels and turbines are subject to great environmental and commercial scrutiny and often fail to deliver on these grounds.

The difficulty of developing a commercially viable and environmentally sensitive hydrokinetic device should not be underestimated, particularly as the sea is a very hostile environment. Storm damage due to high winds is well understood and sea water is very corrosive to most metals. Fouling by sea weed and other micro marine creatures is also a challenge that occurs in a matter of months. One particular challenge is maintaining electrical integrity, as long term subsea power cable integrity over rocks remains unresolved for devices needing a solid base for their foundation.

A further problem associated with prior art devices is ease of maintenance. Intervention costs are very high for subsea devices requiring a Diving Support Vessel (DSV) to recover the device. Floating devices typically do not need a (DSV) but frequently need to be recovered to a dry dock to make major repairs, such as damaged rotor bearings.

There remains a need in the art for an efficient, environmentally sound hydrokinetic device with good reliability and resilience.

It is an object of the invention to provide a hydrokinetic device which overcomes at least one problem associated with the prior art.

SUMMARY OF THE INVENTION

According to an aspect of the invention there is provided a hydrokinetic system comprising a structure defining both an undershoot flow-path and an overtopping flow-path for driving a rotor. Such a system provides for advantageous efficiency gains.

According to another aspect of the invention, there is provided a hydrokinetic system for generating electricity from hydropower, the system comprising a floatable or floating structure for mooring, the structure comprising: a generally horizontal rotor; a deflector for deflecting, in use, impinging water to an undershoot flow-path and to an overtopping flow-path to rotate the rotor; and a generator for generating electricity from rotation of the rotor.

In use of the system, the impinging water may suitably be a stream of water, such as for example a river, oceanic or tidal current. Advantageously, the system may be deployed at a surface of such a stream, In particular, by virtue of there being both an undershoot flow-path and an overtopping flow-path, the system can harness hydropower from the flow of a stream as well as from any waves that may be present at the surface of the stream. In an embodiment, the system may be deployed such that at least a part of any waves in a stream are deflected to the overtopping flow-path, whilst at least part of an underlying current of water is deflected to the undershoot flow path, with water deflected along both paths driving the rotor.

In an embodiment, the or each deflector comprises a top surface for deflecting water to the overtopping flow-path, and a bottom surface for deflecting water to the undershoot flow-path. In this way, water in underlying currents that impinges on the bottom surface of the deflector is deflected by the bottom surface to the undershoot flow path, and water in surface waves that impinges on the top surface of the deflector is deflected to the overtopping flow-path. This arrangement provides a simple and robust way of separating impinging water into the respective flow paths.

In an embodiment, the or each deflector may be elongate along a longitudinal axis. The or each deflector may optionally be regular along a longitudinal axis. The or each deflector may have a triangular cross section to define the top and bottom surfaces. For example, the or each deflector may conveniently be mounted with an apex of the triangle facing away from the rotor and with a side of the deflector facing the rotor, the longitudinal axis of the deflector being generally parallel to a rotational axis of the rotor.

The apex facing away from the rotor may suitably lie substantially at water level in use. Advantageously, at least one deflector may comprise an irregular triangular cross section with a shortest side in cross section facing the rotor, a longest side in cross section facing generally downwards to define the bottom surface and a remaining side in cross section facing generally upwards to define the top surface.

The impinging water may be directed to a fore overtopping flow-path when water impinges from a fore direction, and to an aft overtopping flow-path when water impinges from an aft direction. In this way, when the system is used in water that flows in both directions with respect to the system, such as in tidal water, electricity can be generated with maximum efficiency irrespective of the prevailing direction of water flow. In such circumstances, the direction of rotation of the rotor will usually be determined by the direction of water flow in the undershoot flow path. By directing impinging water to one of two overtopping flow-paths, one on each side of the rotor, water in the respective overtopping flow path always acts to reinforce the direction of rotation of the rotor as determined by the water in the undershoot flow path.

For example, the structure may comprise a fore deflector to deflect water impinging from a fore direction to the fore overtopping flow-path, and an aft deflector for deflecting water impinging from an aft direction to the aft overtopping flow-path.

In an embodiment, at least part of the rotor stands clear below the deflector or deflectors to engage the undershoot flow-path and thereby drive the rotor.

In an embodiment, the system comprises a movable member defining an overtopping reservoir adjacent a side of the rotor, for collecting water deflected along the overtopping flow-path to provide a hydrostatic head acting on the rotor. When the system is configured to direct water to fore and aft overtopping flow-paths for bi-directionality, the system may advantageously comprise fore and aft movable members defining fore and aft overtopping reservoirs adjacent respective fore and aft side of the rotor, for collecting water deflected along the associated overtopping flow-path to provide a hydrostatic head acting on the corresponding side of the rotor.

In an embodiment, the or each movable member activates or deactivates an associated overtopping flow path. Suitably, the or each movable member may be movable between a closed position in which water deflected along an associated (activated) overtopping flow-path is collected in an associated overtopping reservoir, and an open position in which water deflected along the associated (non-activated) overtopping flow path is permitted to flow past an associated side of the rotor. Optionally, the or each movable member may comprise a louvre door. The or each fore moveable member may comprise one or more fore louvre doors, and/or the or each aft moveable member may comprise one or more aft louvre doors. Thus, the system may comprise a plurality of fore and aft louvre doors.

To help preserve buoyancy, the or each deflector may comprise a hollow outer body having packing material disposed therein.

To mitigate blockages, the system may comprise a debris screen mounted to intersect the overtopping flow-path.

In an embodiment, the structure may comprise first and second pontoons bridged by the rotor. This provides good stability at low cost. The first and second pontoons may be further bridged and connected by fore and aft deflectors each for deflecting impinging water to an undershoot flow-path and to an overtopping flow-path to rotate the rotor. In this manner a stable and bi-directional structure may be provided.

For balance of the structure, one of said pontoons may comprise the generator with the other of said pontoons comprising one or more of: an electrical inverter, an electrical transformer, an electrical breaker, and an export power cable junction box.

Suitably, the rotor may be mounted via fresh water bearings. At least one of said pontoons may comprise a device for generating fresh water from higher salinity water, for example for use in fresh water bearings. Conveniently, the system may comprise a fresh water transfer line for supplying fresh water from one of said pontoons to the other of said pontoons. Suitably, the device for generating fresh water may be a reverse osmosis unit.

To assist in cooling, the structure may comprise a ventilation system above deck. Advantageously, the ventilation system comprises a ventilation member, such as a ventilation funnel, with an elevated air inlet. To aid visibility of the platform and optionally assist navigation, the ventilation system or ventilation member may comprise a navigational light. In an embodiment, the structure comprises first and second pontoons each comprising a ventilation system above deck.

The floatable platform is a floating platform in use. Conveniently, the structure may comprise one or more ballast tanks for adjusting the buoyancy of the structure. The buoyancy of the structure may, for example, be adjusted to engage the deflector with impinging water.

Suitably, the structure may be arranged to have a buoyancy such that, in use, water is deflected to the undershoot flow-path and to the overtopping flow-path to rotate the rotor.

In an embodiment, the rotor is mounted on the pontoons by freshwater lubricated bearings.

In an embodiment, the rotor comprises a hollow cylinder rotor body with radially extending rotor blades. This provides for a lightweight rotor. For strength and durability, the rotor body may comprise fibre-reinforced concrete incorporating axially extending tendons. To preserve buoyancy upon any ingress of water, the rotor body may have packing material disposed therein.

The system may comprise a deadweight anchor for mooring the structure. In an embodiment, the system comprises a plurality of deadweight anchors and the structure is arranged for mooring, or moored, to said plurality of deadweight anchors.

The deadweight anchor (or anchors) may conveniently comprise a stanchion (i.e. one or more stanchions) for attachment to a hawser cable of the structure, the stanchion being acutely angled with respect to a generally horizontal base of the deadweight anchor. In an embodiment, the stanchion is angled such that, in use, at highest astronomical tide (HAT), and after taking into account weather induced tidal surge at HAT, the angle made by the hawser cable and the anchor stanchion upon attachment is always less than 90 degrees. Advantageously, the stanchion may comprise a formation, such as for example a fish neck, for engaging a connecting mechanism of a guide rod, such as for example a latch mechanism.

The system may comprise an export power cable for exporting electricity from the structure. To counteract abrasive damage of the power cable by contact with a substrate, such as the sea bed, a segment of the export cable may be suspended between the floating structure and a deadweight anchor.

From yet another aspect of the invention there is provided a networked hydrokinetic system for generating electricity from hydropower, the system comprising: a floating structure comprising a rotor for engaging a flow of water and a generator for generating electricity from rotation of the rotor; a deadweight anchor for mooring the structure; and an export power cable for exporting electricity from the structure, wherein a segment of the export cable is suspended between the floating structure and the deadweight anchor.

In an embodiment the export cable comprises a further suspended segment between the deadweight anchor and a further floating structure of the system. The export cable may additionally comprise yet a further suspended segment between the further floating structure and a further deadweight anchor of the system, or indeed a plurality of still further segments suspended between a plurality of still further floating structures and still further deadweight anchors of the system. The segments may be integral with each other or comprise distinct lengths of cable.

Suitably the export power cable comprises a grid segment between a deadweight anchor and an onshore destination for electricity. The grid segment may advantageously be buried. In an embodiment, the grid segment is a shared segment connected to export electricity generated by a plurality of floating structures.

One or more of said suspended segments, and preferably all suspended segments of the export cable, may comprise cable floats to aid their buoyancy. In an embodiment, one or more of said suspended segments, and preferably all suspended segments of the export cable, comprise a bend in the horizontal plane.

For additional strength, the export cable may advantageously comprise a plurality of carbon fibre filaments coated with an electrically conductive material encapsulated in an electrically insulating material. The electrically conductive material may, for example be nickel.

From still another aspect of the invention, there is provided a deadweight anchor for taut mooring of a floating structure, the anchor comprising: an anchor base for resting on a seabed in a deployed position; and a stanchion extending from the anchor base, for attachment to a mooring cable of a floating structure, the stanchion extending non-vertically from the anchor base when the anchor base is in the deployed position. Suitably, the stanchion may be at least 5 degrees, preferably at least 10 degrees off vertical. Advantageously, the anchor may comprise a plurality of said stanchions extending from the anchor base. In an embodiment, the stanchion(s) may have a length of at least 0.5 meters, e.g. a length in the range of from 0.5 to 2 meters.

Conveniently, the stanchion may be acutely angled with respect to a generally horizontal seabed resting surface of the deadweight anchor, in particular of the anchor base. Advantageously, the stanchion may be acutely angled with respect to the seabed in use. In an embodiment, the stanchion is acutely angled at an angle in the range of from 10 to 80 degrees.

To provide for secure mooring of a floating structure, the stanchion may be angled such that, in use, at highest astronomical tide (HAT), and after taking into account weather-induced tidal surge at HAT, the angle made by the cable and the anchor stanchion upon attachment is always less than 90 degrees.

For ease of attaching a cable to the stanchion, the stanchion may advantageously comprise a formation, for example a fish neck, for engaging a connecting mechanism of a guide rod. Such an arrangement advantageously allows a mooring cable to be slid onto the stanchion with a guide rod.

For yet a further aspect of the invention, there is provided a method of mooring a floating structure, the method comprising: deploying a deadweight anchor to a seabed, the deadweight anchor comprising a non-vertically extending stanchion comprising a formation for engaging a connecting mechanism; engaging a guide rod with said formation of the stanchion; sliding a ring of a mooring cable of the floating structure along the guide rod to engage the stanchion; applying a tension to the mooring cable to maintain engagement of the ring with the stanchion; and disengaging the guide rod from said formation of the stanchion. The deadweight anchor and/or floating structure may, for example, be as described elsewhere herein. Advantageously, the guide rod may comprise a camera to assist underwater location with the formation of the stanchion.

Suitably, tension may be maintained in the mooring cable by mooring to an opposed, second anchor according to the same method. Tension may thus be mutually maintained in opposed cables by taut mooring.

Advantageously, a plurality of mooring cables may be attached to the anchor according to the same method.

Throughout the description and claims of this specification, the words "comprise" and "contain" and variations of the words, for example "comprising" and "comprises", mean "including but not limited to", and do not exclude other components, elements, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects unless incompatible therewith. Other features of the invention will become apparent from the following detailed description. Generally speaking the invention extends to any novel one, or any novel combination, of the features disclosed in this specification (including any accompanying claims and drawings). Thus features, integers, characteristics, compounds, described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

In order that the invention may be more readily understood, reference will now be made, by way of example, to the accompanying drawings in which:

FIG. 2a is a partial isometric view of the system of FIG. 1 with a left pontoon of the system omitted;

FIG. 2b is a partial end view corresponding to the view of FIG. 2a;

FIG. 2c is a detailed view of area A in FIG. 2b;

FIG. 3a is a plan view of the system of FIG. 1;

FIG. 3b is a side view of the system of FIG. 1;

FIG. 3c is a detailed view of area A in FIG. 3a;

FIG. 4a is an end view of a rotor assembly of the system of FIG. 1;

FIG. 4b is a front view of the rotor assembly of FIG. 4a;

FIG. 4c is a detailed view of area B in FIG. 4a;

FIG. 4d is a detailed view of area A in FIG. 4b;

FIG. 5a is an end view of a trumpet tension assembly of the rotor assembly of FIG. 4a;

FIG. 5b is a front view of the trumpet tension assembly of FIG. 5a;

FIG. 5c is an opposed end view of the trumpet tension assembly of FIG. 5a;

FIG. 5d is a sectional front view of the trumpet tension assembly of FIG. 5a taken at line A in FIG. 5b;

FIG. 6a is an isometric view of a rotor blade assembly of the rotor assembly of FIG. 4a;

FIG. 6b is an end view of the rotor blade assembly of FIG. 6a;

FIG. 7a is an end view of a right bearing housing of the system of FIG. 1;

FIG. 7b is a plan view of the bearing housing of FIG. 7a;

FIG. 7c is a front view of the bearing housing of FIG. 7a;

FIG. 7d is a sectional end view of the bearing housing of FIG. 7a taken at line A in FIG. 7c;

FIG. 7e is a detailed view of area A in FIG. 7d;

FIG. 8a is a plan view of a brake assembly of the pontoon bearing housing of FIG. 7a;

FIG. 8b is an end view of the brake assembly of FIG. 8a;

FIG. 8c is a front view of the brake assembly of FIG. 8a;

FIG. 8d is a sectional end view of the brake assembly of FIG. 8a taken at line A in FIG. 8c;

FIG. 8e is a detailed view of area B in FIG. 8d;

FIG. 9a is a plan view of a right pontoon of the system of FIG. 1;

FIG. 9b is a front view of the right pontoon of FIG. 9a;

FIG. 9c is a sectional view of the right pontoon of FIG. 9a, taken at line A in FIG. 9b;

FIG. 9d is an end view of the right pontoon of FIG. 9a;

FIG. 9e is a detailed view of FIG. 9c;

FIG. 11a is a plan view of a left pontoon of the system of FIG. 1;

FIG. 11b is a front view of the left pontoon of FIG. 11a;

FIG. 11c is an end view of the left pontoon of FIG. 11a;

FIG. 11d is a sectional view of the left pontoon of FIG. 11a, taken at line A in FIG. 11b;

FIG. 13a is an end view of a cover assembly of the system of FIG. 1;

FIG. 13b is a plan view of the cover assembly of FIG. 13a

FIG. 13c is a sectional front view of the cover assembly of FIG. 13a, taken at line B in FIG. 13b;

FIG. 14a is an end view of a deadweight anchor of the system of FIG. 1;

FIG. 14b is a detailed view of area A in FIG. 14a;

FIG. 14c is an isometric view of the deadweight anchor of FIG. 14a;

FIG. 15a is a front view of a pontoon anchor assembly of the system of FIG. 1;

FIG. 15b is a sectional view of the anchor assembly of FIG. 15a, taken along line A in FIG. 15a;

FIG. 15c is a detailed view of area B in FIG. 15b;

FIG. 15d is a detailed view of area C in FIG. 15b; and

DETAILED DESCRIPTION

Figure 1:
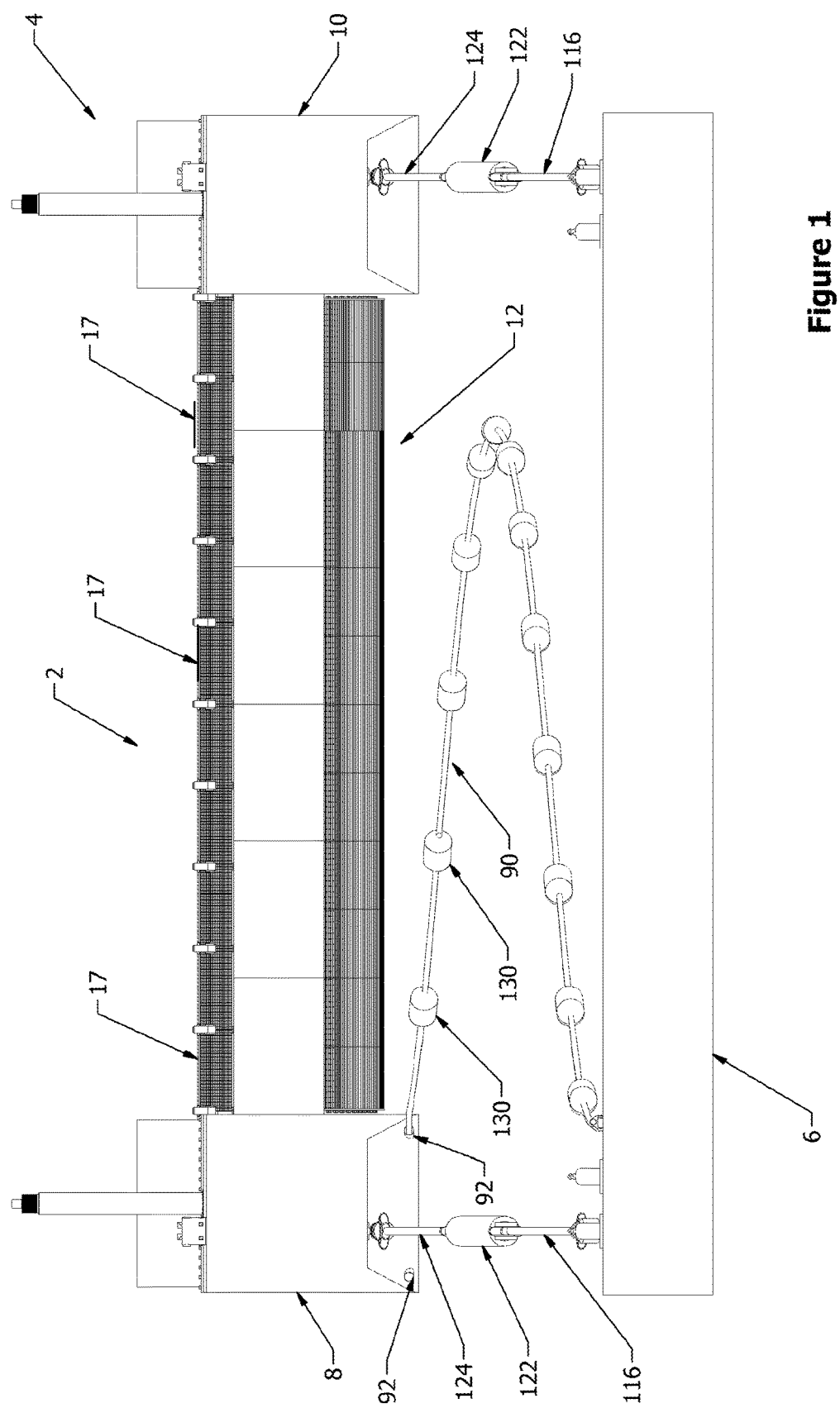
FIG. 1 is a front view of a hydrokinetic system according to an embodiment of the invention.

With reference to FIGS. 1 to 3c, there is provided, in an embodiment of the invention, a hydrokinetic system 2 for converting the kinetic energy of bidirectional current flow, and wave energy, into electricity. The hydrokinetic system 2 comprises a floating platform 4, and first and second deadweight anchors 6.

The floating platform 4 comprises left and right spaced pontoons 8, 10 each with angled bow and stern for streamlining. The pontoons 8, 10, are generally parallel to each other and are bridged centrally by an orthogonally oriented, generally cylindrical rotor assembly 12. Fore and aft of the rotor assembly 12, the floating platform comprises first and second deflectors 13, 15, which also bridge and connect the pontoons 8, 10, and direct water-flow to the rotor assembly 12 as will be described. The rotor assembly 12 is covered by a cover assembly 17 comprising a plurality of louvre doors 18, which also play a part in directing water flow, as will also be described.

Referring now to FIGS. 4a to 4d, the rotor assembly 12 acts as the turbine of the system. The rotor assembly 12 comprises a uniformly cylindrical rotor body 14 supporting generally radially extending rotor blades 16. The rotor body 14 is rotatably mounted to the left and right pontoons 8, 10 via associated left and right hub assemblies 20, 22 of the rotor assembly 12.

The rotor body 14 is a hollow cylinder fabricated from reinforced concrete filled with light-weight foam 19 to ensure that any potential water ingress will not significantly affect the buoyancy of the rotor assembly 12. This facilitates maintenance of the rotor assembly 12, for example if one or more of the hub assemblies 20, 22 needs to be replaced or repaired. Furthermore, enhanced buoyancy significantly reduces the dynamic friction within left and right bearing housings 24, 26 in which the rotor assembly 12 is rotatably mounted on the left and right pontoons 8, 10 as will be described.

To improve the tensile strength of the reinforced concrete forming the rotor body 14, left and right faces of the rotor body 14 comprise an embedded ring of aligned post tension trumpets assemblies 31. Referring now to FIGS. 5a to 5d, each tension trumpet assembly 31 comprises a trumpet 28, an anchor head 30, threaded adaptor 34 and serrated steel wedges 32. Post-tensioning forces are provided by tendons (not shown) made up of one or more strands inside a plurality of ducts (not shown) extending axially along the rotor body 14, connected at either end to a trumpet assembly 31. The strands are stressed with high-pressure hydraulic jacks and locked off with the hardened, serrated steel wedges 32. Each trumpet 28 has an internal thread for a threaded adaptor 34 that is used to attach the hub assemblies 20, 22 to the rotor body 14 at respective ends.

The left and right hub assemblies 20, 22 of the rotor assembly 12 are identical in structure. With reference to FIGS. 4a and 4b, each hub assembly 20, 22 comprises a rim 21 and a plurality of spokes 23 connecting the rim to a respective left and right rotor axle 25, 27 having rotor axle grooves 29 therein.

With reference to FIGS. 4b, 4c, 6a and 6b, the rotor body 14 bears a plurality of rotor blades 16. The rotor blades 16 are fixedly attached to the rotor body 14, by a plurality of rotor blade anchor plates 36 that provide an interface with water flow as is known in the art. The anchor plates 36 form a rotor blade assembly 37 together with the rotor blades 16.

Referring now to FIGS. 7a to 7e, the right bearing housing 26 is fixedly attached to the right pontoon 10, forming a water tight bulkhead. The bearing housing 26 is generally block shaped and an upper wall 39 of the bearing housing 26 comprises a plurality of ducts for receiving threaded rods (not shown) for engaging aligned ducts of a neighbouring part of the pontoon 10. Referring additionally to FIG. 9a, the rods can be secured in place via nut-boxes 41 accessible on deck of the right pontoon 10. By virtue of this arrangement, the bearing housing 26 provides additional structural strength to the deck of the right pontoon 10, whilst remaining easily replaceable if required.

The right bearing housing 26 comprises a fresh water lubricated journal bearing 38 within a spherical bearing 40. The spherical bearing 40 mitigates the risk of edge wear to the journal bearing 38 due to any wave induced flexure of the floating platform 4 and or misalignment. To prevent potential rotation of the spherical bearing 40, the spherical bearing 40 incorporates a short stub axle 42. This stub axle 42 is retained by a bushing 44 but the tolerances are such that limited movement of the spherical bearing 40 is still possible.

The fresh water lubricated journal bearing 38 comprises of a plurality of fresh water ports 52 and a rotor axle sealing system 54 to prevent water ingress. The spherical bearing 40 is also lubricated by grease to form a water tight seal.

Referring now additionally to FIGS. 8a to 8e, the right bearing housing 26 comprises a brake housing 46 attached to the spherical bearing 40. The brake housing 46 comprises a plurality of static brake discs 48, retained by a plurality of grooves on the inside face of the brake housing 46, and rotating brake discs 50 driven by engagement with the rotor axle grooves 29 in the right rotor axle 27. Braking force may be applied when required by compressing the static brake discs 48 and rotating brake 50 discs together using a plurality of hydraulically operated brake pistons 51 pushing against the outer most static brake disc 48.

The left bearing housing 24 is identical to the right bearing housing, save that it is fixedly attached to the left pontoon 8 and engages the left rotor axle 25.

In addition to supporting the rotor assembly within the bearing housings 24, 26, the pontoons 8, 10, comprise components for the generation of electricity from rotation of the rotor assembly 12, and for facilitating transmission of the generated electricity.

Referring now to FIGS. 9a to 9e, the right pontoon 10 acts as a "driven end" and comprises, in addition to the right bearing housing 26, a conventional reverse osmosis system 55 for producing fresh water from sea water to assist lubrication in the bearing housings 24, 26, a gearbox 56 connected by a flexible coupling 58 to the right rotor axle 27 supported in the right bearing housing 26, and an asynchronous electrical generator 60 located directly above the gearbox 56.

Each of these internal components 55, 56, 58, 60 of the right pontoon 10 comprises a respective housing and is interconnected with the other components as required to perform its function. This modularity facilitates maintenance and replacement of the various components. The housings are removably secured in place by duct and rod arrangements (not shown) as described above in respect of the right bearing housing 26 and are thus able to provide structural strength to the right pontoon 10.

The system 2 is designed for the input from the right axle 27 to the gearbox 56 to be about eight rpm, developing a significant amount of torque. To convert the low speed high torque input into a high speed low torque output, the gearbox 56 comprises five stages (not shown). The first three stages have a planetary gear design with stages four and five using a spur gear design. In this configuration an output shaft (not shown) of the gearbox 56, which is connected to the asynchronous electrical generator rotates at approximately one thousand rpm.

Figure 10:
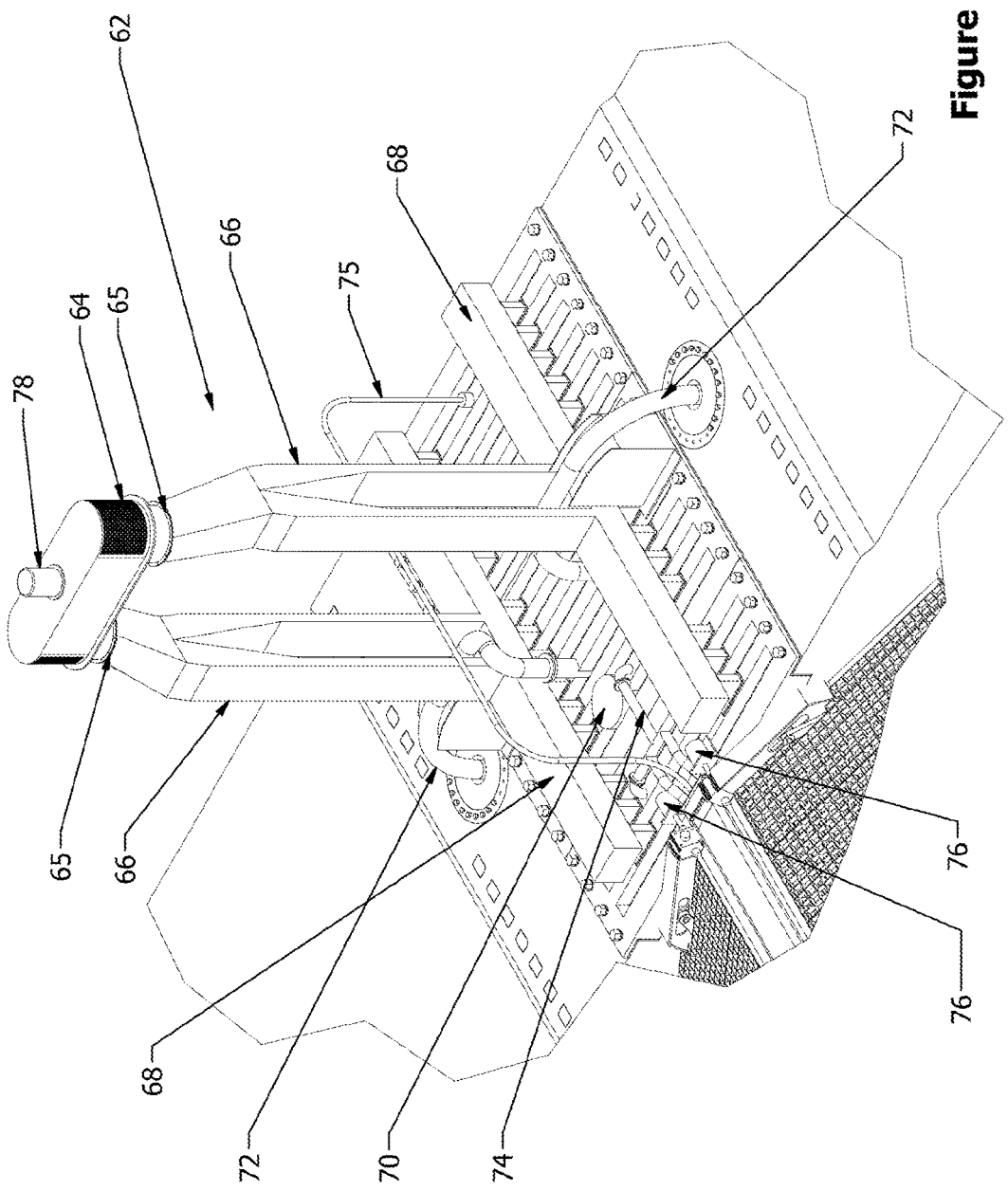
FIG. 10 is an isometric view of a funnel assembly of the right pontoon of FIG. 9a with an outer shell removed.
Figure 11E:
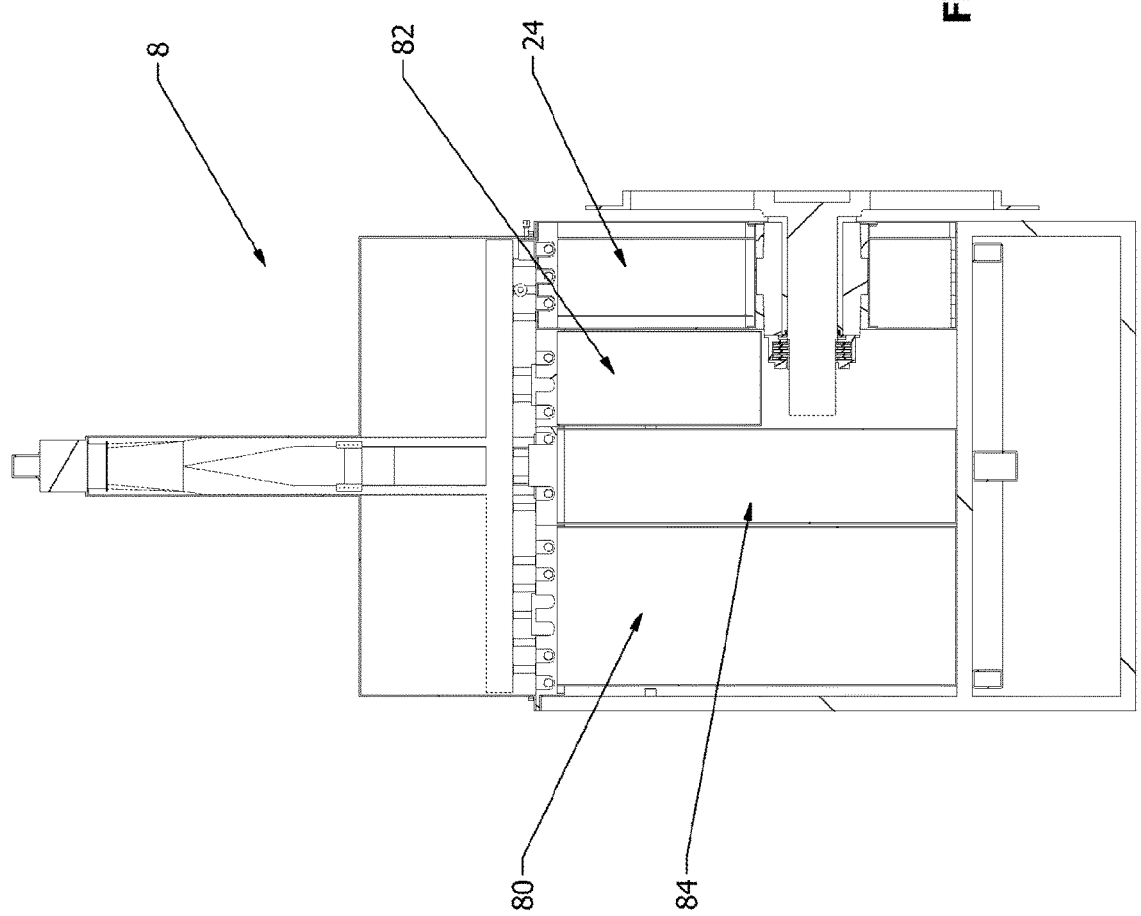
FIG. 11e is a detailed view of FIG. 11d.

Referring additionally to FIG. 10, the internal components 55, 56, 58, 60 of the right pontoon 10 are cooled with the help of a right ventilation funnel 62 borne above deck on the right pontoon 10. The right ventilation funnel 62 comprises an air inlet/outlet 64 (with filter) connected to and supported by first and second upright ventilation ducts 66 (one inlet duct, the other an outlet duct) leading to respective ventilation manifolds 68 for ventilating and cooling the internal components 55, 56, 58, 60 of the right pontoon 10. Air is drawn in and pushed out of the ventilation ducts 62 via the air inlet/outlet 64 by fans 65. Also located above deck on the right pontoon are access hatches 70, pipes 72 for supplying sea water to the reverse osmosis system 55, a fresh water line 74 for carrying fresh water to the left and right pontoon bearing housings 24, 26, motors 76 for actuating the louvre doors 18 as will be described, and a generated electricity transfer cable 75. The presence of the ventilation system and other components above deck provides advantages in ease of maintenance and cooling. Furthermore, the funnel arrangement, wherein the air inlet/outlet 64 is located at the top of upright ducts, at a substantial height above deck, ensures that ventilation is not compromised by larger waves passing over deck, e.g. in heavy seas. In essence, the funnel 62 is able to act as a snorkel to ensure a steady supply of cooling air to the components of the right pontoon 10.

To mitigate the risk of potential collision from maritime shipping the right ventilation funnel 62 is fitted with navigation lights 78. The right ventilation funnel 62 is painted to represent a navigation buoy and with the navigation light colour and flash frequency being correct, the floating platform 4 can be utilised as a navigation buoy. Thus the operating and maintenance costs of existing navigation buoys can be transferred over to a tidal energy project using the system 2. Faster tidal currents can also be accessed in shallower waters leading to improved performance. For a navigation channel, a plurality of floating platforms 4 may, for example, be spaced every 300 meters on both sides of the channel, which compares favourably to a typical navigation channel buoy spacing of 1500 meters on one side.

With reference to FIGS. 11a to 11e, the left pontoon 8 acts as an "electrical distribution end" and comprises, in addition to the left bearing housing 24, components for converting and transferring electricity. The left pontoon 8 receives electrical energy from the right pontoon 10 via the generated electricity transfer cable 75. On the left pontoon 8, an electrical inverter 80 converts asynchronous alternating current supplied by the asynchronous electrical generator 60, into synchronous alternating current. The synchronous current is then transferred to a high voltage transformer 82, where the voltage of the current is raised. From the high voltage transformer 82 the current is passed to an electrical breaker 84.

Each of these internal components 80, 82, 84 of the left pontoon 8 comprises a respective housing and is interconnected with the other components as required to perform its function. This modularity facilitates maintenance and replacement of the various components. The housings are removably secured in place by duct and rod arrangements (not shown) as described above in respect of the right bearing housing 26 and are thus able to provide structural strength to the left pontoon 8.

Figure 12:
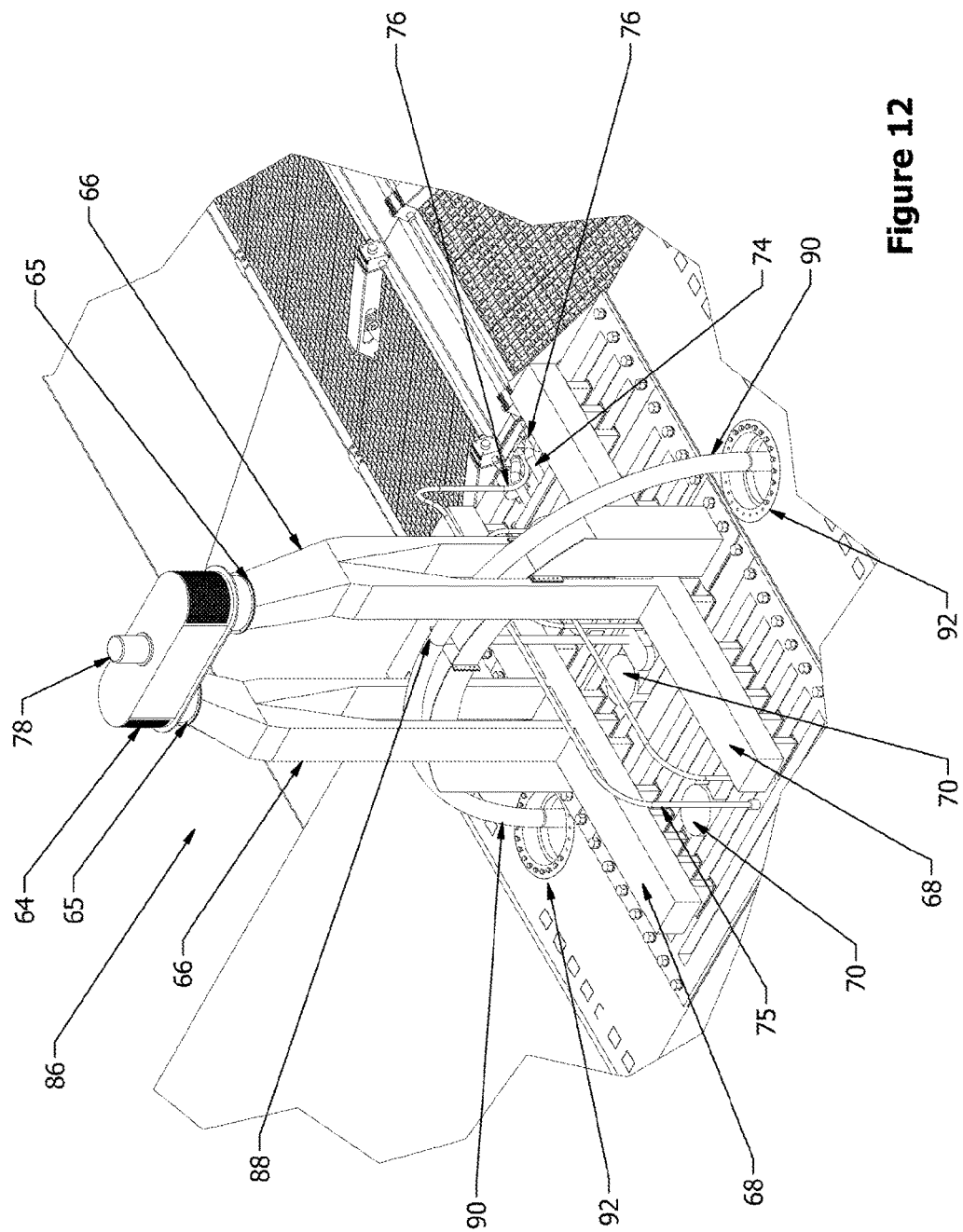
FIG. 12 is an isometric view of a funnel assembly of the left pontoon of FIG. 11a with an outer shell removed.

Referring additionally to FIG. 12, the internal components 80, 82, 84 of the left pontoon 8 are cooled with the help of a left ventilation funnel 86 borne above deck on the left pontoon 8. The left funnel 86 comprises the same ventilation components as the right ventilation funnel 62, with like references used for like parts in FIG. 12. Navigational components may also be present as described in respect of the right funnel 62—such components may be carried by one or both funnels 62, 86, as may be required. Also located above deck on the left pontoon 8 are the generated electricity transfer cable 75, the fresh water line 74 for receiving fresh water from the right pontoon to assist in lubrication in the left bearing housing 24, a plurality of access hatches 70, motors 76 for driving the louvre doors 18, and an export power cable junction box 88.

The export power cable junction box 88 receives electrical current from the electrical breaker 84, and allows electrical connections with a maximum of four export power cables 90. Each export power cable 90 may enter the sea via an associated export power cable conduit 92.

As aforesaid, the system comprises first and second 13, 15 deflectors and a plurality of louvre doors 18 to direct water flow in the region of the rotor assembly 12.

Referring again to FIGS. 2b and 2c, the deflectors 13, 15 are identically made from reinforced concrete, with a hollow oblique triangular cross section. The triangular cross section of the deflectors 13, 15 is irregular, such that the deflectors have a shortest cross sectional face 94, a longest cross sectional face 96 forming a bottom surface of the deflector and a remaining cross sectional face 98 forming a top surface of the deflector. The deflectors 13, 15 are mounted fore and aft of the rotor assembly 12 with first apexes 100 of the deflectors 13, 15 facing away from the rotor assembly 12, the shortest faces 94 of the deflectors 13, 15 facing towards the rotor assembly 12, and the long and remaining faces 96, 98 facing generally downwards and upwards respectively. The first apexes 100 of the deflectors 13, 15 lie above the rotating axis 99 of the rotor assembly, while a second apex 101 of the deflectors lies below the rotating axis 99 of the rotor assembly 12 to optimise and accelerate flow underneath the rotor assembly 12. The deflectors 13, 16 are mounted on the pontoons 8, 10 under compression by the deployment of a post tension technique, with post tension trumpets 28 embedded in the side of the pontoons 8, 10, substantially as described hereinabove in respect of the rotor body 14, save that no threaded adaptors 34 are required for this application.

The deflectors 13, 15 are uniform about their longitudinal axis and filled with light-weight foam 19 to ensure that any potential water ingress will not significantly affect their buoyancy.

The deflectors 13, 15 are positioned such that, in use of the system, the sea level is typically at about the plane defined by the first apexes 100 facing away from the rotor assembly 12. Water impinging on the deflectors 13, 15, for example as a result of a tidal flow, is then predominantly deflected or channelled downwards by the bottom surface 96, to an undershoot flow path of the rotor assembly 12. In the undershoot flow path the deflected flow of water engages the rotor blades 16 of the rotor body 14, thereby rotating the rotor assembly 12, allowing the electricity to be generated, converted and transmitted from the pontoons 8, 10 as will be apparent from the above description. Notably, due to the presence of fore and aft deflectors 13, 15, the hydrokinetic system 2 is able to generate electricity bidirectionally in this manner.

Water impinging above the first apex 100 of a deflector 13, 15, for example as a result of a wave, is deflected or channelled upwardly by the top surface 98 to an overtopping flow path of the rotor assembly 12. In particular upwardly channelled water may be collected in an associated one of fore and aft funnel-shaped reservoirs 103 formed between the side of the rotor assembly 12 and the louvre doors 18, creating an elevated head of water above sea level that drives the side of the rotor assembly 12 i.e. an overtopping mechanism.

With reference to FIGS. 13a to 13c, the louvre doors 18 of the cover assembly 17 are arranged in pairs fore and aft of the rotor assembly 12. Each of the doors 18 can be moved between an open position (shown on the left of FIG. 13c) and a closed position (shown on the right in FIG. 13c). In the open position there is a substantial gap 105 between the door 18 and the rotor assembly 12 to facilitate flow of water from the funnel-shaped reservoir 103 past the rotor assembly 12, thereby reducing or eliminating hydrostatic head acting on the rotor assembly 12 on the relevant side. In the closed position, the gap 105 between the door 18 and the rotor assembly 12 is narrowed, such that the water is collected in the funnel shaped reservoir 103 and creates a substantial hydrostatic head acting on the relevant side of the rotor assembly 12, in particular on the blades 16 thereof. To counteract bypass, the louvre doors 18 are fitted with rubber seals (not shown) on their edge.

A difference between hydrostatic head on fore and aft sides of the rotor assembly 12 can provide additional overtopping hydropower to the rotor assembly 12. To ensure that overtopping hydropower is coordinated with the undershoot flow-path, under normal operating conditions the upstream louvre doors 18 will be closed and downstream louvre doors 18 open to prevent potential reverse torque from large waves passing over the top of the floating platform 4. Each louvre door 18 is driven between the open and closed position by two screw jacks 102 connected to the doors by connecting rods 104. The screw jacks 102 are interconnected by two common drive shafts 106 driven by motors 76 located, as aforesaid, inside the funnels 62, 86 of the floating platform 4.

The overtopping mechanism is thus also bidirectional, with fore and aft funnel shaped gaps 105 existing between the rotor assembly 12 and fore and aft louvre doors 18 respectively. To optimise the performance of the overtopping mechanism, it may be desirable to ensure that an upstream funnel-shaped reservoir 103 fills up, with the opposed reservoir 103 remaining substantially empty. This may be achieved by blocking, as desired, the gaps 105 between the rotor assembly 12 and the louvre doors 18.

In this way, when the louvre doors are positioned such that the gap 105 on the fore side of the rotor assembly 12 is narrow and the gap 105 on the aft side of the rotor assembly 12 is wide, the rotor assembly is urged to rotate in a first direction by the water flowing from the fore overtopping reservoir 103 past the rotor assembly 12 in a fore overtopping flow path. When the louvre doors 18 are positioned such that the gap 105 on the aft side of the rotor assembly 12 is narrow and the gap 105 on the fore side is wide, the rotor assembly is urged to rotate in a second, opposite direction by water flowing from the aft overtopping reservoir 103 in an aft overtopping flow path.

Above each louvre door 18, intersecting the overtopping flow path into the funnel shaped reservoirs 103, and extending over the top of the rotor assembly 12, is a filter screen 108, supported by a filter screen framework 110. The filter screens 108 help prevent debris getting into the funnel shaped reservoirs 103, which could result in blockage. The mesh size of the filter screen 108 may be chosen by balancing improved performance with a finer mesh size against the inevitable higher maintenance costs to keep the filter screen 108 clear from blockages. If desired, various mesh sizes may be used interchangeably to counter a range of environmental factors. The filter screen framework 110 also provides additional rigidity to the pontoons 8, 10 and deflectors 13, 15.

The rotor blades 16 may be driven simultaneously by current flow deflected underneath the rotor assembly 12 and wave energy entering a funnel-shaped reservoir 103. The simultaneous application of both principles significantly improves the efficiency of the system.

The elevation of the deflectors 13, 15, and therefore the performance of the rotor assembly 12, can be tuned, for example to wave height, by the addition or removal of water from ballast tanks (not shown) contained within each pontoon 8, 10.

Referring again to FIGS. 3a and 3b, the first and second deadweight anchors 6 are used to secure the floating platform 4 in the correct position for generating electricity, fore and aft using a taut mooring principle. The deadweight anchors 6 are of identical structure and positioned on the seabed in use. The seabed location of each deadweight anchor 6 needs to be relatively flat. If this is not the case a dredger can be used to prepare the seabed prior to installation.

With reference to FIGS. 14a to 14c, each deadweight anchor is generally oblong in plan and comprises a plurality of compartments 112 for ballast. The deadweight anchors are designed to be floated into position, as per a bridge caisson, and then sunk in a controlled manner using inflatable bags (not shown) attached to the base of the deadweight anchor. The bags are then removed and the compartments 112 deadweight anchor filled with sand ballast (not shown) from a dredger. The ballast may be sourced locally to mitigate the potential environmental risk from ballast sourced elsewhere. Decommissioning and removal of the deadweight anchor 6 is possible by simply reversing this process.

Each deadweight anchor comprises four pairs of cylindrical anchor stanchions 114 so as to be able to anchor two floating platforms 4 in series.

For each line or cable used to anchor the floating platform 4, a lower hawser cable 116 is attached to the cylindrical anchor stanchion 114 by an anchor ring 118 that incorporates a pinned connection. To prevent the anchor ring 118 from sliding off the anchor stanchion 114, the anchor stanchion 114 is angled such that at highest astronomical tide (HAT), and after taking into account weather induced tidal surge at HAT, the angle made by the lower hawser cable 116 and the anchor stanchion 114 is always less than 90 degrees.

Installation of the anchor ring 118 onto the anchor stanchion 114 is possible without the need for divers. This may be achieved by attaching a guide rod (not shown) with a latch mechanism onto a fish neck 120 located on the end of the anchor stanchion 114. This may be assisted by a waterproof camera slid over the guide rod with a viewing screen located on the intervention vessel. When the guide rod has been successfully latched, the camera is pulled to surface and the anchor ring 118 slid down the guide rod and onto the anchor stanchion 114. The camera may then be slid over the guide rod to confirm the anchor ring has been correctly installed. To remove the guide rod a jar up action is used to shear a pin thereby releasing the latch mechanism.

Referring now additionally to FIG. 1, at the opposite end to the anchor ring 118, the lower hawser cable 116 is attached to an anchor cable shock absorber 122 to reduce wave induced anchor cable load. The taut mooring system and streamlined design of the floating platform 4 also help to reduce wave induced anchor cable loads.

The anchor cable shock absorber 122 is attached to the upper hawser cable 124. The upper hawser cable 124 is attached to a pontoon anchor assembly 125 comprising a plurality of cylindrical chain links 126 with holes for a pinned connection to interlink the chain links together.

With reference to FIGS. 15a to 15d, each cylindrical chain link 126 has a circumferential groove to accept a plurality of temporary load support pins 128. The cylindrical chain links 126 are retained within an outer mandrel 130 and the load from the uppermost cylindrical chain link 126a is transferred to the outer mandrel 130 by a load measuring pin 132. The load from the outer mandrel 130 is transferred to a hawser pipe 134 via a hawser pipe upper bushing 136 and the hawser pipe 134 is fixedly attached to the pontoon 8, 10. At the base of the hawser pipe 134, a hawser pipe lower bushing 138 supports the outer mandrel 130 and protects the hawser pipe 134 from abrasive wear. The hawser pipe lower bushing 138 can be recovered, using a specially designed recovery tool that latches into an internal groove of the hawser pipe lower bushing 138.

To tension each line, the temporary load support pins 128 are engaged into the uppermost cylindrical chain link 126a thereby transferring tensile load away from the load measuring pin 132 so that it can be removed. A hydraulic jack (not shown) is then positioned on top of the outer mandrel 130 and a pin connection made with the uppermost cylindrical chain link 126a. The hydraulic jack is then used to transfer the load away from the temporary load support pins 128 and they are withdrawn. The hydraulic jack is then used to lift the upper most chain link 126a until the next chain link 126b is aligned with the temporary load support pin holes. The temporary load support pins 128 are then re-engaged and the load transferred back to them. The pin 127 connecting the upper most cylindrical chain link 126a to the next cylindrical chain link 126b is then removed and the hydraulic jack and upper most cylindrical chain link 126a removed. A repeat of this process is used to tension the anchor cable 116, 122, 124 by the removal of subsequent cylindrical chain links 126.

Referring again to FIG. 1, the high voltage export power cable 90 is suspended between the left pontoon 8 and an associated deadweight anchor 6, without contacting the seabed. To prevent abrasion on the seabed during tidal movements and wave induced motion, the export cable 90 is fitted with cable floats 130 and installed with a bend in the horizontal plane. To support the horizontal catenary and to mitigate the risk of fatigue induced electrical conductor failure, the electrical conductors of the export power cable 90 comprise a plurality of carbon fibre filaments coated with an electrically conductive material, typically nickel. Said electrical conductors are encapsulated within an electrically insulating material.

From the deadweight anchor 6, the export power cable 90 may be buried under the seabed and routed to shore. Additionally or alternatively, the export power cable 90 may be routed to another floating platform 4, suspended as before with cable floats 130.

The system 2 may be installed in any suitable location for generating electricity from hydropower. The floating platform 4 is designed to need only ten meters of water depth at lowest astronomical tide (LAT) to operate safely. A shallow water location has many advantages. The main advantage is that velocity of shallow water current flow is significantly higher than deeper water. A shallow water location of the floating platform 4 also potentially reduces the required length of the export power cable 90 to shore which significantly improves the project economics. It also provides considerable commercial leverage by potentially helping to fund an export power cable 90 that could also be used by third parties in deeper water. This would transform the commercial viability of deeper water sites that are currently uneconomic to exploit using existing hydrokinetic technology.

In terms of regular maintenance, fouling of the rotor blades 16 cannot be prevented. However, referring again to FIGS. 2a and 2b, access to the rotor blades for regular cleaning using a pressure washer (in calm weather) is provided by a maintenance walkway 140 above the rotor assembly 12. The same maintenance walkway 140 can also be used to access the rotor blades 16 for maintenance or replacement after the temporary removal of a filter screen panel 108. It can also be used to service or replace any of the screw jacks 102 and louvre doors 18.

Service and light maintenance access to the equipment contained within the pontoons 8, 10, such as the reverse osmosis system 55, the gearbox 56, the electrical generator 60, the inverter 80, high voltage electrical transformer 82 or electrical breaker 84, is possible via the access hatches 70. If a major equipment failure or upgrade is required, the relevant funnel 62, 86 can be easily removed, and the affected component removed and replaced with a spare. This is particularly facilitated by the modular housing of the components, greatly reducing downtime.

Anchor line removal for inspection will be required to assure long term integrity of the system 2. Each pontoon 8, 10 has two hawser pipes 134, fore and aft. The second hawser pipe 134 allows a second anchor cable to be attached to the deadweight anchor 6 before the primary anchor cable can be removed for inspection. It also permits tow rope attachment during first installation of the floating platform. Anchor line tension is removed from the first anchor cable by adding cylindrical chain links 126 using a hydraulic jack mounted on top of the outer mandrel 130. The anchor cable's uppermost cylindrical chain link 126a can then be detached from the pontoon 8, 10. The cylindrical chain links 126, upper hawser cable 124 and the anchor cable shock absorber 122 are then recovered by the intervention vessel leaving only the lower hawser cable 116 and anchor ring 118 attached to the deadweight anchor 6. Removal of the anchor ring 118 from the anchor stanchion 114 is achieved by positioning the intervention vessel one hundred and eight degrees away from the anchor cable's original orientation after which the anchor ring 118 will slide off the anchor stanchion 114 and the lower hawser cable 116 and anchor ring 118 can be recovered.

Command and control of the floating platforms is achieved by a data communications system (not shown), using a power line communication (PLC) system via the export power cable 90, from each floating platform 4 to an onshore control room. The size and scope of the control room will be dependent upon the number of floating platforms that it controls. This control room will also coordinate operations and maintenance activities with the local electricity distribution company.

It is envisaged that the system 2 will have negligible impact on the local environment. There are many reasons for this assertion. The journal bearings 38 of the rotor axles 25, 27 are fresh water lubricated. The gearbox 56 does contain oil but two barriers exist to prevent leakage into the environment and regular inspection and monitoring is easily achievable due to the modular housing design of the pontoons 8, 10. The tips of the rotor blades 16 are designed for a maximum speed of 3.0 m/sec minimising any potential impact damage to the local fish population or marine mammals, (ref Hydropower good practise guidelines—UK Environmental agency December 2012). Given the relatively short length of the rotor blades 16, it is feasible to make them from a rubber material, if new guidance is forthcoming to this effect. The rotor blades 16 are provided with edge protection by the provision of the hub assemblies 20, 22.

Access to the funnel-shaped reservoirs 103 from above is prevented by the filter screen 108, thereby mitigating the risk of marine mammals being trapped or injured in any way by the rotor blades 16. The filter screen 108 also helps to protect the local population from their inquisitiveness.

Consideration also needs to be given to migratory fish and whether the proposed design would affect them in any way. The rotor assembly 12 is designed to lie close to the surface and therefore, even in shallow water there will still be plenty of room for the fish to pass underneath. The rotor blade tip speed is designed to be less than 3.0 m/sec, and as mention above, this will not harm the fish in any way.

A multiple floating platform project would capture a fraction of the tidal kinetic energy available and therefore this would negate the risk of any material change to the tidal range downstream thereby assuring the ongoing protection for wading bird communities. Due to the flexibility of deployment, consideration can be given on a site specific basis to mitigate any disturbance risks to bird communities on a site by site basis.

The system 2 has been designed for installation in any location where current flow and wave energy are present. This includes but is not limited to rivers, manmade channels, tidal estuaries, naturally formed tidal channels and any location where suitable currents exist. Thus, all references herein to "sea" or "seabed" are to be understood accordingly to embrace such uses.

Figure 16:
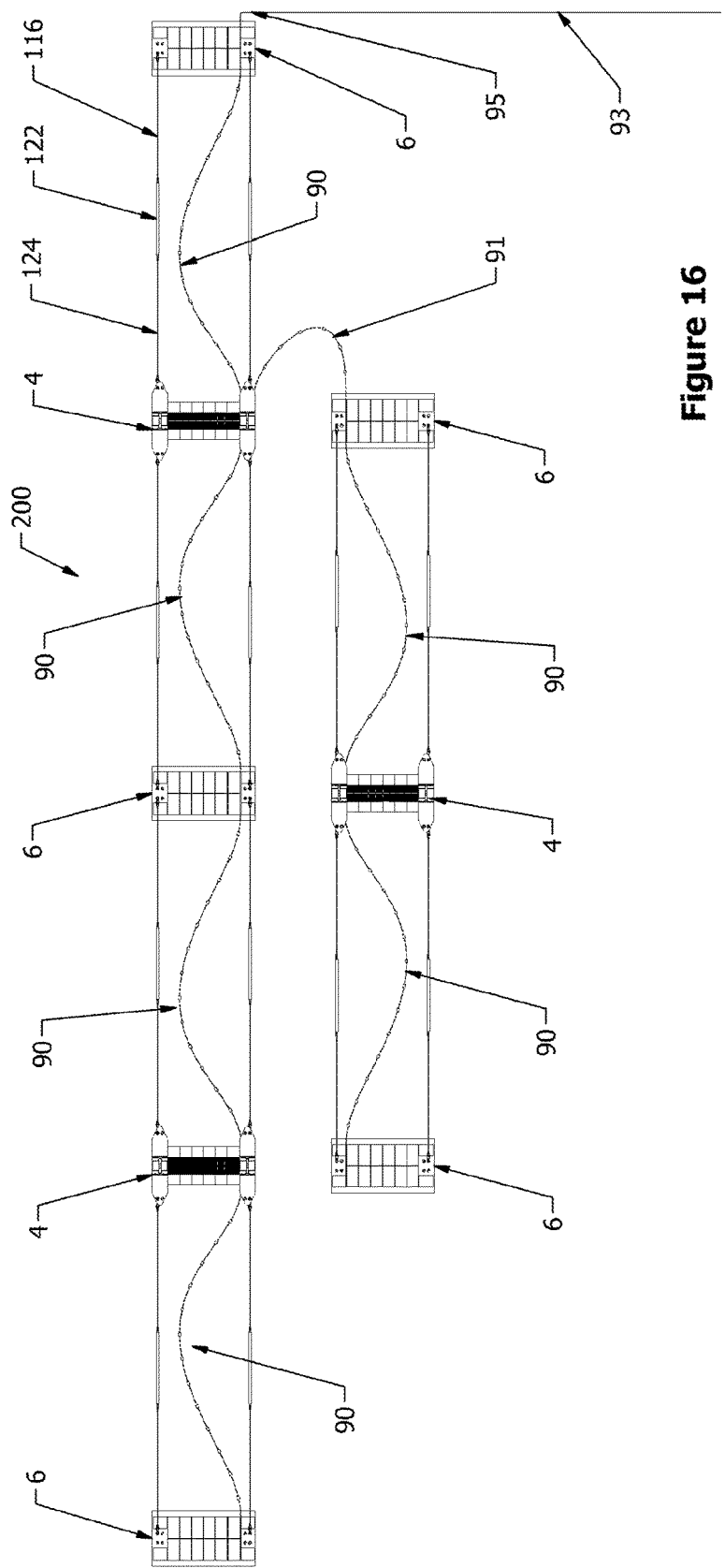
FIG. 16 is a plan view of a networked hydrokinetic system according to a further embodiment of the invention.

A network of floating platforms 4 may be installed in sequence and/or in parallel. Referring now to FIG. 16 in a further embodiment of the invention, a network 200 of floating platforms 4 and deadweight anchors 6 is provided for generating electricity from hydropower. Each floating platform 4 and deadweight anchor 6 is substantially as hereinabove described. In the network 200 the floating platforms 4 and deadweight anchors 6 are interspersed, with each floating platform 4 moored to two deadweight anchors 6 as hereinabove described. The export power cable 90 is routed between the platforms 4 as a plurality of segments electrically connected at both ends within the export power cable junction box 88 contained within the ventilation funnels 86 of said floating platforms 4, and attached to a deadweight anchor 6 between said floating platforms 4. Each floating platform 4 is as hereinabove described. To export power to shore, in the vicinity of a deadweight anchor 6 a subsea splice 95 connects a suspended export power cable segment with a grid segment 93 of the export power cable 90. The grid segment 93 is buried under the seabed and routed to shore. A second line of floating platforms 4 is formed using an interlink segment 91 of the export power cable, electrically connected at both ends using export power cable junction boxes 88 and attached to a deadweight anchor 6.

Those skilled in the art will appreciate that the embodiments of the invention, which have been described as non-limiting examples, may be readily modified without departing from the scope of the invention as defined in the appended claims.

The invention claimed is:

1. A hydrokinetic system for generating electricity from hydropower, the system comprising a floatable or floating structure for mooring, the structure comprising:
 a generally horizontal rotor;
 a deflector for deflecting, while the system is in use, impinging water to rotate the rotor, wherein the impinging water is deflected to: (i) an undershoot flow-path, or (ii) the undershoot flow-path and an overtopping flow-path;

a movable member, the movable member comprising fore and aft movable members defining respective fore and aft overtopping reservoirs adjacent respective fore and aft sides of the rotor; and a generator for generating the electricity from rotation of the rotor;

wherein when the impinging water is deflected to the overtopping flow-path, the impinging water is directed to a fore overtopping flow-path when water impinges from a fore direction and to an aft overtopping flow-path when water impinges from an aft direction, the fore and aft overtopping reservoirs for collecting water deflected along a respective one of the fore or the aft overtopping flow-paths to provide a hydrostatic head acting on the rotor.

2. The system of claim 1, wherein the deflector comprises a top surface for deflecting water to the overtopping flow-path, and a bottom surface for deflecting water to the undershoot flow-path.

3. The system of claim 2, wherein the deflector is elongate along a longitudinal axis and has a triangular cross section to define the top and bottom surfaces.

4. The system of claim 3, wherein the deflector is mounted with an apex facing away from the rotor and with a side of the deflector facing the rotor, the longitudinal axis of the deflector being generally parallel to a rotational axis of the rotor.

5. The system of claim 4, wherein the deflector comprises an irregular triangular cross section with a shortest side in cross section facing the rotor, a longest side in cross section defining the bottom surface and a remaining side in cross section defining the top surface.

6. The system of claim 1, wherein the deflector comprises a fore deflector to deflect water impinging from the fore direction to the fore overtopping flow-path and an aft deflector to deflect water impinging from the aft direction to the aft overtopping flow-path.

7. The system of claim 1, wherein the movable member is movable between a closed position in which water deflected along one or both of the fore or aft overtopping flow-paths is collected in a respective one of fore or aft overtopping reservoirs, and an open position in which water deflected along one or both of the fore or aft overtopping flow-paths is permitted to flow past a respect one of the fore or aft sides of the rotor.

8. The system of claim 1, wherein the movable member comprises a louvre door.

9. The system of claim 8, wherein the system comprises a plurality of fore and aft louvre doors.

10. The system of claim 1, wherein the deflector comprises a hollow outer body having packing material disposed therein.

11. The system of claim 1, comprising a debris screen mounted to intersect the overtopping flow-path.

12. The system of claim 1, wherein said structure comprises first and second pontoons bridged by the rotor.

13. The system of claim 12, wherein the first and second pontoons are further bridged and connected by fore and aft deflectors each for deflecting impinging water to the undershoot flow-path and to the overtopping flow-path.

14. The system of claim 12, wherein one of said pontoons comprises the generator and the other of said pontoons comprises one or more of: an electrical inverter, an electrical transformer, an electrical breaker, or an export power cable junction box.

15. The system of claim 12, wherein at least one of said pontoons comprises a device for generating fresh water from higher salinity water.

\* \* \* \* \*